US011238653B2

(12) United States Patent
Jiang

(10) Patent No.: US 11,238,653 B2
(45) Date of Patent: Feb. 1, 2022

(54) INFORMATION PROCESSING DEVICE, INFORMATION PROCESSING SYSTEM, AND NON-TRANSITORY COMPUTER-READABLE STORAGE MEDIUM FOR STORING PROGRAM

(71) Applicant: FUJITSU LIMITED, Kawasaki (JP)

(72) Inventor: Shan Jiang, Machida (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/214,393

(22) Filed: Dec. 10, 2018

(65) Prior Publication Data

US 2019/0206135 A1    Jul. 4, 2019

(30) Foreign Application Priority Data

Dec. 29, 2017 (JP) .............................. JP2017-255093

(51) Int. Cl.
*G06T 19/00* (2011.01)
*G06T 7/90* (2017.01)
(Continued)

(52) U.S. Cl.
CPC ............ *G06T 19/006* (2013.01); *G06F 3/011* (2013.01); *G06F 3/017* (2013.01); *G06F 3/0304* (2013.01);
(Continued)

(58) Field of Classification Search
CPC ......... G06T 19/006; G06T 19/20; G06T 7/70; G06T 2207/10028; G06T 7/55;
(Continued)

(56) References Cited

U.S. PATENT DOCUMENTS 9,965,895 B1\* 5/2018 Gray ......................... G06T 7/12
10,319,150 B1\* 6/2019 Canada ................... G06T 11/60
(Continued)

FOREIGN PATENT DOCUMENTS

JP    2005-18385    1/2005
JP    2014-526174   10/2014
(Continued)

OTHER PUBLICATIONS

JPOA—Office Action of Japanese Patent Application No. 2017-255093 dated Jun. 29, 2021 with Full Machine Translation.

*Primary Examiner* — Xiao M Wu
*Assistant Examiner* — Scott E Sonners
(74) *Attorney, Agent, or Firm* — Fujitsu Patent Center

(57) ABSTRACT

An information processing device includes: a memory configured to store data illustrating a three-dimensional model reproducing an environment of a work site; and a processor coupled to the memory and configured to specify a first partial region in which a work target is present from the three-dimensional model based on a detection result of an orientation of a work operator present at the work site, specify a second partial region corresponding to the work target from the first partial region based on at least one of a geometric shape of the first partial region and color information of the first partial region, and register, in the memory, three-dimensional coordinates of the second partial region in a coordinate space in which the three-dimensional model is formed as position information for displaying, according to a position of the work target, image information on an image in which the work site is photographed.

13 Claims, 22 Drawing Sheets

(51) Int. Cl.
*G06T 7/60* (2017.01)
*G06T 17/00* (2006.01)
*G06K 9/62* (2006.01)
*G06F 3/01* (2006.01)
*G06T 7/70* (2017.01)
*G06F 3/0484* (2013.01)
*G06F 3/03* (2006.01)
*G06T 7/50* (2017.01)

(52) U.S. Cl.
CPC ....... *G06F 3/04847* (2013.01); *G06K 9/6202* (2013.01); *G06T 7/60* (2013.01); *G06T 7/70* (2017.01); *G06T 7/90* (2017.01); *G06T 17/00* (2013.01); *G06K 2009/6213* (2013.01); *G06T 7/50* (2017.01); *G06T 2207/30196* (2013.01); *G06T 2207/30244* (2013.01)

(58) Field of Classification Search
CPC ........... G06T 2207/30244; G06T 17/00; G06T 15/20; G06T 15/205; G06T 19/003; G06T 2200/24; G06T 2207/10024; G06T 7/73; G06T 2219/2004; G06T 2219/2016; G06T 7/60; G06T 7/74; G06T 15/08; G06T 2200/04; G06T 2200/08; G06T 2200/21; G06T 2207/20092; G06T 2207/20212; G06T 2210/61; G06T 2219/004; G06F 3/011; G06F 3/013
See application file for complete search history.

(56) References Cited

U.S. PATENT DOCUMENTS

| | | | |
|---|---|---|---|
| 2012/0128208 A1* | 5/2012 | Leyvand | G06K 9/44 382/103 |
| 2012/0183137 A1* | 7/2012 | Laughlin | H04N 7/185 380/200 |
| 2013/0002649 A1 | 1/2013 | Wu et al. | |
| 2014/0361981 A1* | 12/2014 | Kamamori | G06F 3/017 345/156 |
| 2015/0293586 A1* | 10/2015 | Kritt | G06T 11/60 345/158 |
| 2016/0041623 A1* | 2/2016 | Galor | G06F 3/013 345/156 |
| 2016/0269631 A1 | 9/2016 | Jiang et al. | |
| 2016/0335578 A1 | 11/2016 | Sagawa | |
| 2017/0358131 A1* | 12/2017 | Weiss | G06F 3/0416 |
| 2018/0218538 A1* | 8/2018 | Short | G06T 19/006 |
| 2018/0314326 A1* | 11/2018 | Terahata | G06F 3/013 |
| 2018/0321816 A1* | 11/2018 | Bostick | G03H 1/0005 |

FOREIGN PATENT DOCUMENTS

| | | |
|---|---|---|
| JP | 2015-125641 | 7/2015 |
| JP | 2016-17757 | 2/2016 |
| JP | 2016-167688 | 9/2016 |
| JP | 2017-68601 | 4/2017 |
| WO | 2015/107665 A1 | 7/2015 |

* cited by examiner

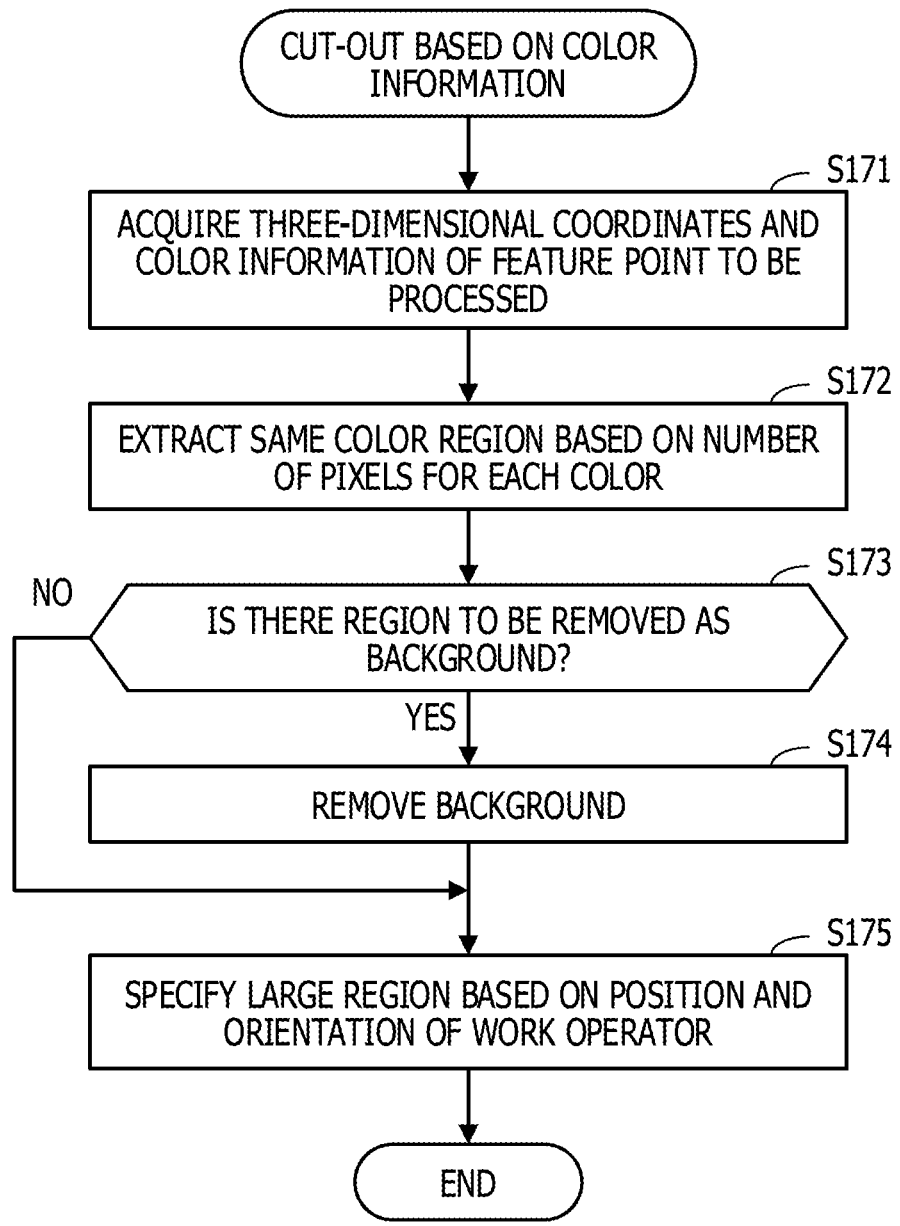

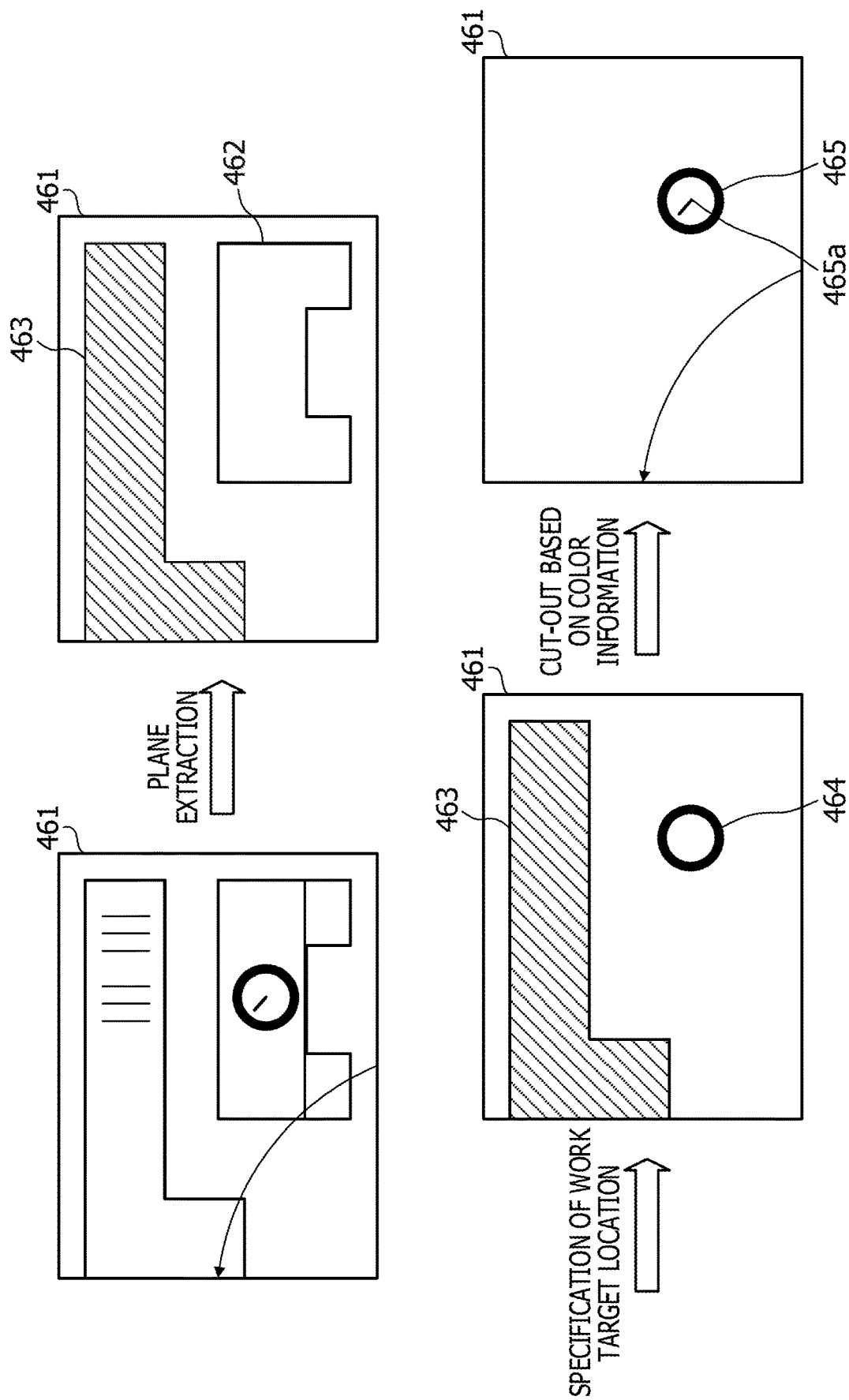

INFORMATION PROCESSING DEVICE, INFORMATION PROCESSING SYSTEM, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2017-255093, filed on Dec. 29, 2017 the entire contents of which are incorporated herein by reference.

FIELD

The embodiments discussed herein are related to an information processing device, an information processing system, and a non-transitory computer-readable storage medium for storing a program.

BACKGROUND

Augmented Reality (AR) technology is known which superimposes and displays a virtual image at a predetermined position on an image in which a real space is photographed. This AR technology is becoming popular in applications such as assisting of work of a work operator by superposing and displaying image information indicating work content, precautions for work, and so forth on a camera image in a work space of a factory and so forth.

As an example of the AR technology, a remote cooperative work support system has been offered in which a work operator holds a head mount display (HMD) and a head mount camera (HMC), and an operating person visually recognizes a panorama image of a work site created based on an image photographed by the HMC. In this system, when the operating person inputs an instruction on the panorama image, information on instruction to the work operator is transmitted to the HMD. A camera image is displayed on the screen of the HMD, and instruction information is superposed and displayed as an AR image at a position corresponding to an instruction input on the camera image.

As an example of related technology, a system has been offered in which a three-dimensional model indicating a work object appears on the display screen at the position of the work object on the camera image displayed on the HMD based on the detection result by the depth sensor provided in the HMD.

An example of the related art includes Japanese Laid-open Patent Publication No. 2016-167688, and Japanese Laid-open Patent Publication No. 2015-125641.

SUMMARY

According to an aspect of the embodiments, an information processing device includes: a memory configured to store data illustrating a three-dimensional model reproducing an environment of a work site; and a processor coupled to the memory and configured to specify a first partial region in which a work target is present from the three-dimensional model based on a detection result of an orientation of a work operator present at the work site, specify a second partial region corresponding to the work target from the first partial region based on at least one of a geometric shape of the first partial region and color information of the first partial region, and register, in the memory, three-dimensional coordinates of the second partial region in a coordinate space in which the three-dimensional model is formed as position information for displaying, according to a position of the work target, image information on an image in which the work site is photographed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 21 is an example of a flowchart illustrating a procedure of a cut-out process based on color information; and FIG. 22 is a diagram illustrating an example of a process of specifying a work target location by a plane extraction and a cut-out based on color information.

DESCRIPTION OF EMBODIMENTS

In order to superpose and display image information for work support at a position corresponding to the work target on the camera image, the position (three-dimensional coordinates) in the coordinate space of the three-dimensional model which reproduces the environment of the work site for each work target is set in advance. If such a setting work is performed manually, the work is complicated, and there is a problem that the work efficiency is low. Therefore, although it is conceivable to automate such setting work, in this case, there is a problem that it is difficult to accurately specify the position of the work target.

In one aspect, the techniques disclosed in the embodiments intend to provide an information processing device, an information processing system, and an information processing method which are capable of accurately specifying a three-dimensional position of a work target whose image information is displayed.

Hereinafter, embodiments discussed herein will be described with reference to the drawings.

First Embodiment

Figure 1:
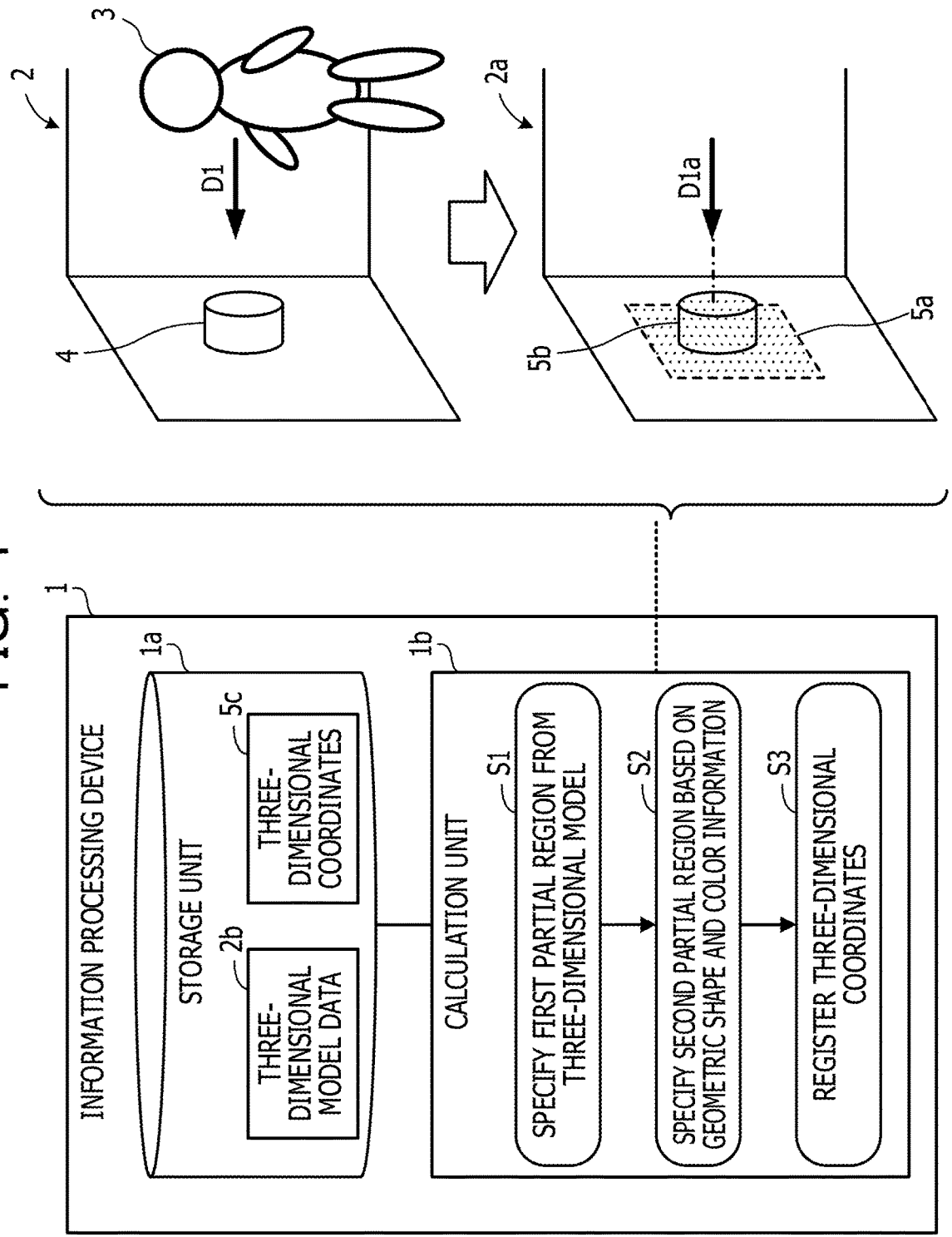
FIG. 1 is a diagram illustrating an example of a configuration of and an example of a process of an information processing device according to a first embodiment.

FIG. 1 is a diagram illustrating an example of a configuration of and an example of a process of an information processing device according to a first embodiment.

An information processing device 1 according to the first embodiment is, for example, a device for creating information used in the following work support system. This work support system provides information for supporting the work as image information for a work operator working at a work site. For example, the work operator is given an environment in which an image in which a region including a work target is photographed may be viewed in real time. Image information for work support is superposed and displayed on the image using the AR technology.

In such a work support system, three-dimensional coordinates of a work target whose image information is displayed are registered in advance. The information processing device 1 according to the present embodiment automatically specifies such a work target, and registers the three-dimensional coordinates of the specified work target.

As illustrated in FIG. 1, in the present embodiment, a work operator 3 is caused to actually work at a work site 2 for registration of the work target. The movement of the work operator 3 is detected, and a work target is specified from a three-dimensional model 2a based on the detection result and the data (three-dimensional model data 2b) of the three-dimensional model 2a reproducing the environment of the work site 2. At least the orientation of the work operator 3 is detected as the movement of the work operator 3. In the following description, it is assumed that a work target 4 is present in the work site 2.

The information processing device 1 includes a storage unit 1a and a calculation unit 1b. The storage unit 1a is constructed as a storage area of a storage device, such as a random access memory (RAM) or a hard disc drive (HDD), which is included in the information processing device 1. The calculation unit 1b is provided, for example, as a processor included in the information processing device 1.

The storage unit 1a stores three-dimensional coordinates 5c in addition to the aforementioned three-dimensional model data 2b. For example, the three-dimensional model data 2b is created in advance and stored in the storage unit 1a. For example, in a case where the work operator 3 holds a camera for photographing a region in the line-of-sight direction, and the orientation of the work operator 3 is detected based on the image of the camera, the three-dimensional model 2a may be created together with the detection of the orientation of the work operator 3, and the three-dimensional model data 2b may be stored in the storage unit 1a. A three-dimensional coordinates 5c is specified by the calculation unit 1b and registered in the storage unit 1a.

The calculation unit 1b performs the following processing. The calculation unit 1b specifies, from the three-dimensional model 2a, based on the detection result of an orientation D1 of the work operator 3, a partial region 5a (first partial region) where the work target 4 is present (step S1). In FIG. 1, a region indicated by hatching in the three-dimensional model 2a is specified as the partial region 5a.

The method of detecting the orientation D1 of the work operator 3 is not particularly limited. For example, the orientation D1 of the work operator 3 may be detected by a sensor of a camera or the like fixedly arranged in the work site 2. Alternatively, it may be detected based on the image of the camera held by the work operator 3 as described above.

The detection result of the orientation D1 of the work operator 3 is converted into, for example, an orientation D1a on the three-dimensional coordinates space where the three-dimensional model 2a is formed. In step S1, the partial region 5a is specified based on the converted orientation D1a. However, for example, as described above, in a case where the detection of the orientation of the work operator 3 and the creation of the three-dimensional model 2a are performed based on the image of the camera held by the work operator 3, such conversion may be unnecessary.

It is desirable that the direction of interest of the work operator 3 (the direction of the line-of-sight) be detected as the orientation D1 of the work operator 3. For example, the work operator 3 may perform a pointing operation for validating the work target 4. In a case where such pointing operation is detected, the partial region 5a may be specified based on the orientation D1 of the work operator 3 and the pointing direction.

Next, the calculation unit 1b specifies, from the partial region 5a, a partial region 5b (second partial region) corresponding to the work target 4 based on at least one of the geometric shape of the specified partial region 5a, or color information of the partial region 5a (step S2). For example, the partial region 5b is specified based on the size of the planar region in the partial region 5a, the distance between the planar region and the work operator 3, and the size of a region for each color in the partial region 5a.

The calculation unit 1b registers, in the storage unit 1a, a three-dimensional coordinates 5c of the partial region 5b in the three-dimensional coordinates space in which the three-dimensional model 2a is formed (step S3). In FIG. 1, the region indicated by the solid line in the partial region 5a is specified as the partial region 5b. The three-dimensional coordinates 5c are position information for displaying image information according to the position of the work target 4 on the image in which the work site 2 is photographed, and, for example, are used in the aforementioned work support system. For example, the coordinates of the central part (for example, the center of gravity) of the specified partial region 5b are registered as the three-dimensional coordinates 5c.

In the process by the above calculation unit 1b, the region with high possibility of having the region corresponding to the work target 4 is narrowed down from the three-dimensional model 2a by the specifying process in step S1. Since this process is performed based on the detection result of the orientation D1 of the work operator 3, the region where the region corresponding to the work target 4 is present is accurately specified. In the specifying process of step S2, the region corresponding to the work target 4 is specified in more detail based on the geometric shape or color information of the partial region 5a from the specified partial region 5a. Thus, the region corresponding to the work target 4 may be automatically specified, and the three-dimensional coordinates 5c may be efficiently registered. In addition, it is possible to specify the three-dimensional coordinates 5c with high accuracy.

Second Embodiment

Next, the work support system according to the second embodiment will be described. The work support system according to the second embodiment provides information for supporting the work as image information for a work operator working at the work site. For example, the work operator is given an environment in which an image of a region including a work target location may be viewed in real time. Image information for work support is superposed and displayed on the image using the AR technology.

Hereinafter, image information to be superposed and displayed is referred to as AR content. As AR content, for example, text information such as work content and precautions for work is displayed together with an image indicating a work target location and so forth. In this way, there is an advantage in that, for example, it is possible to improve the work operator's accuracy of work, and even the work operator with low proficiency level may work easily and accurately.

An environment in which the work operator visually recognizes an image is provided as follows. For example, the work operator carries a portable terminal equipped with a display and a camera on the rear side of the display. When the work operator points the camera to the work target location while viewing the display, an image of a region including the work target location appears on the display, and the AR content is superposed and displayed on the image. As another example, a head mount unit equipped with a camera and a display may be mounted on the work operator's head.

The work support system includes a work support device. The work support device calculates and controls the display position of the AR content in the image based on a three-dimensional model indicating the environment of the work site, and an image photographed by the camera. In order to implement such control, the work support device includes an AR content database in which the AR content and the three-dimensional coordinates of a work target location corresponding thereto are registered. By referring to such AR content database, it is possible to display the AR content accurately aligned with the position of the work target location in the image.

In the AR content database, the three-dimensional coordinates and the AR content of each work target location are registered for a plurality of work target locations in the work site. Therefore, in order to implement work support using the AR content as described above, authoring work is performed in which AR content is created in advance and registered in the AR content database.

In the following description, a work phase in which work support using the AR content is performed is described as a main work phase. A prework phase for building the AR content database referred to in the main work phase is described as an authoring work phase.

Here, first, the configuration of the device used in the main work phase will be described among the devices included in the work support system. After that, the configuration of the device used in the authoring work phase will be described.

Figure 2:
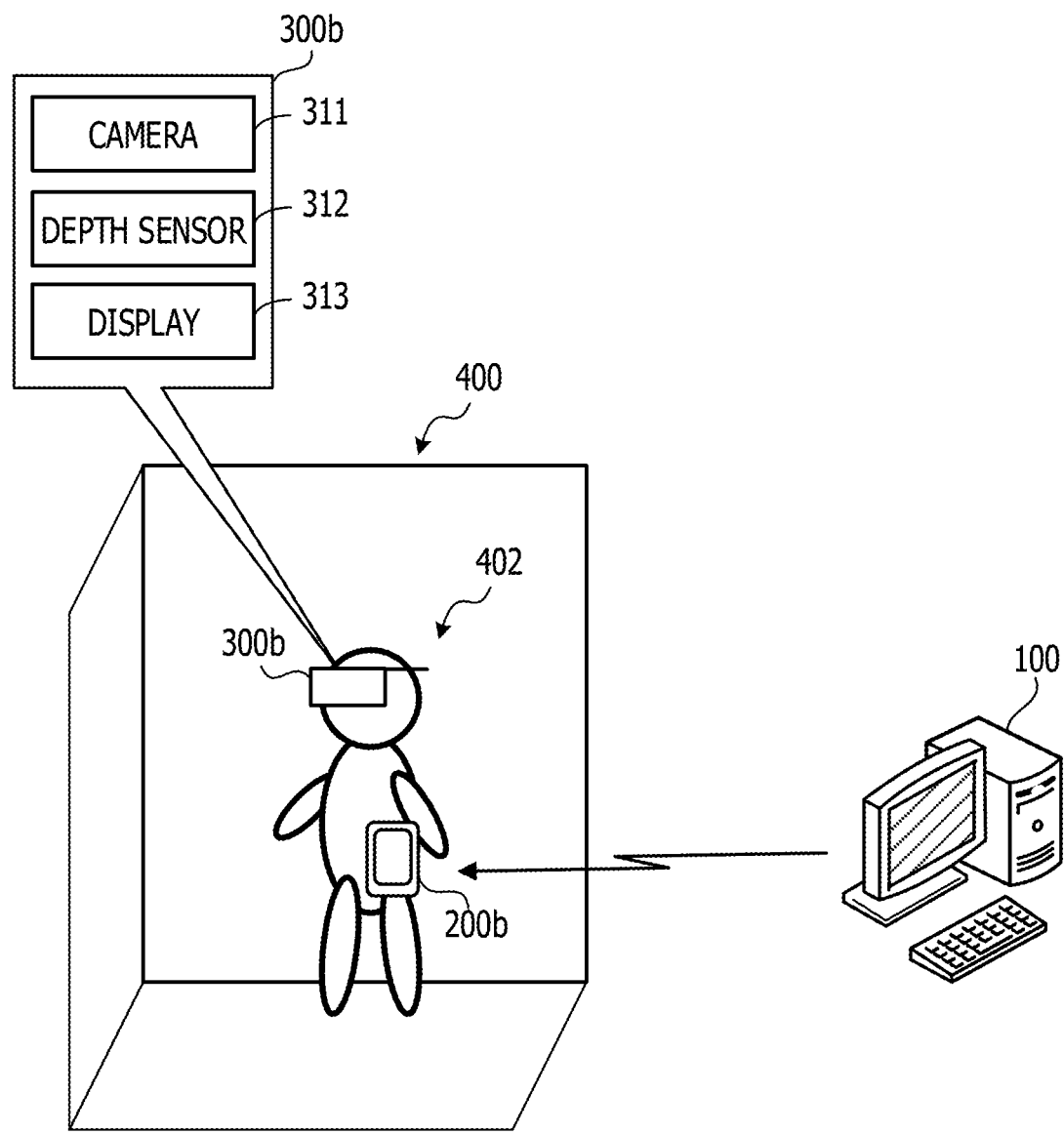
FIG. 2 is a diagram illustrating an example of a configuration of a device used in a main work phase.

FIG. 2 is a diagram illustrating an example of a configuration of the device used in the main work phase. As illustrated in FIG. 2, in the main work phase, a work support device 100, a work operator terminal 200b and a head mount unit 300b are used. The work support device 100 and the work operator terminal 200b are communicable to each other, for example, via a network. The work operator terminal 200b and the head mount unit 300b are communicable to each other, for example, by short-range wireless communication.

A work operator 402 carries the work operator terminal 200b, and performs work with the head mount unit 300b attached to the head. The head mount unit 300b includes a camera 311, a depth sensor 312 and a display 313.

The camera 311 captures a region in a direction substantially same as the direction of the line-of-sight of the work operator 402. The depth sensor 312 measures the depth (distance) for each pixel of the output image from the camera 311 with respect to the region photographed by the camera 311. The depth sensor 312 includes, for example, an infrared irradiation device and an infrared light receiving device, and measures the depth of each pixel by a time of flight (TOF) method or the like. For example, red green blue-depth (RGB-D) data including image data of a color image obtained by the camera 311 and depth data obtained by the depth sensor 312 is output from the head mount unit 300b. The display 313 is a so-called head mounted display, thereby making it possible for the work operator 402 to view the image while performing work.

Figure 3:
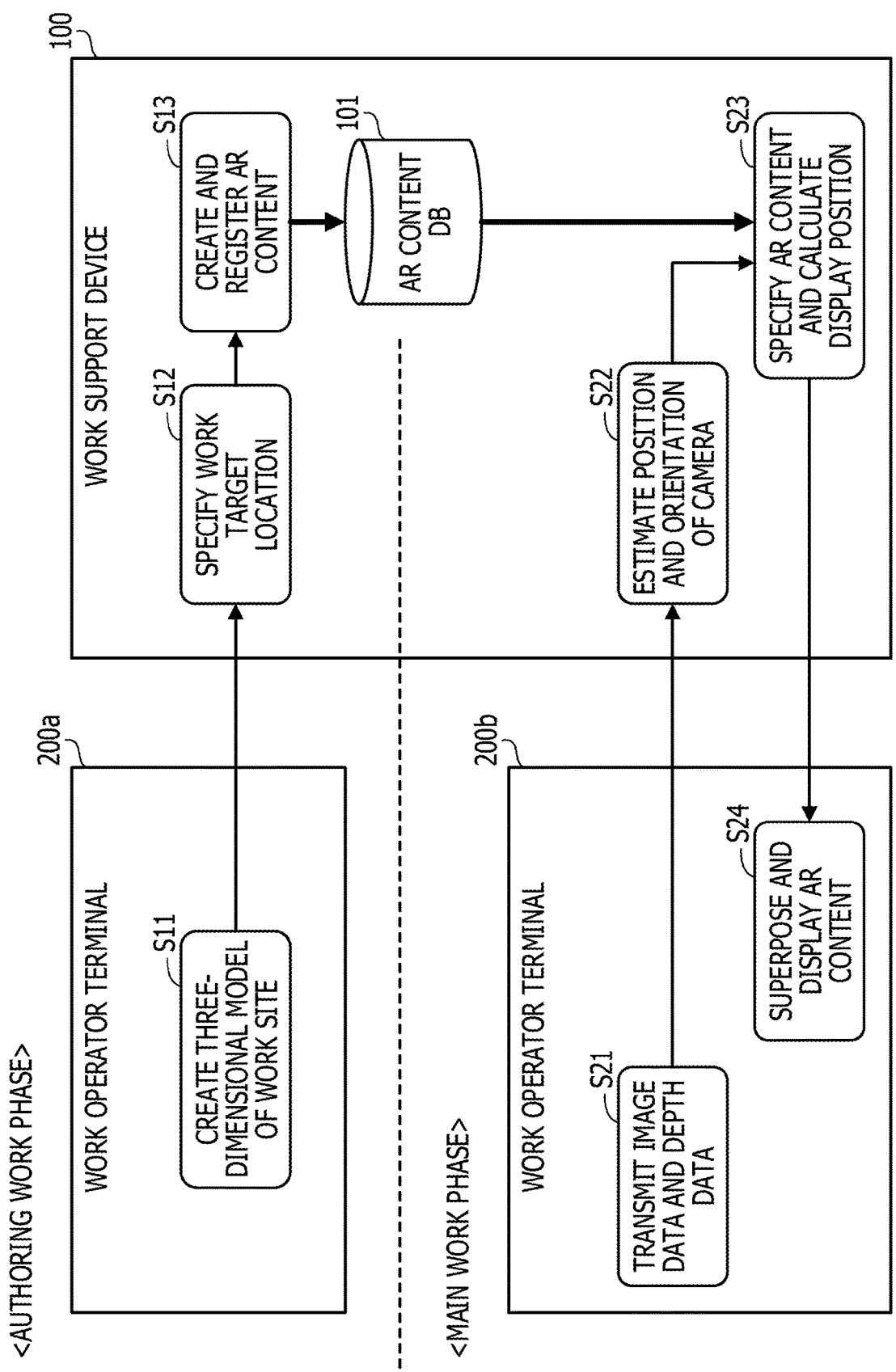
FIG. 3 is a diagram for describing a process for implementing work support.

FIG. 3 is a diagram for describing a process for implementing work support. First, with reference to FIG. 3, an example of a process by the work support device 100 and the work operator terminal 200b in the main work phase will be described.

The work operator terminal 200b receives, from the head mount unit 300b, image data of an image photographed by the camera 311 (hereinafter referred to as a camera image), and depth data detected by the depth sensor 312, and transmits them to the work support device 100 (step S21). The work operator terminal 200b transmits the received image data to the head mount unit 300b, and displays a camera image based on this image data on the display 313.

The work support device 100 estimates the position and orientation of the camera 311 based on the image data and the depth data received from the work operator terminal 200b (step S22). The estimated position of the camera 311 indicates the position of the work operator 402 (for example, the position of the eyes of the work operator 402), and the estimated orientation of the camera 311 indicates the direction of the line-of-sight of the work operator 402. In the estimation of the position and orientation of the camera 311, for example, a three-dimensional model of a work site created in advance is referred. As this three-dimensional model, a model created in the authoring work phase may be used.

The work support device 100 holds an AR content database (DB) 101. As described above, in the AR content database 101, the three-dimensional coordinates of the work target location and the AR content are registered for each of a plurality of work target locations.

In a case where a work target location is included in the photographed region of the camera image based on the received image data, the work support device 100 specifies the AR content corresponding to the work target location from the AR content database 101. The work support device 100 calculates the display position of the specified AR content in the camera image (step S23).

In the AR content specifying process, the work support device 100 automatically specifies the work target location included in the photographed region of the camera image based on, for example, the estimated position and orientation of the camera 311, and the three-dimensional coordinates of each work target location registered in the AR content database 101. Alternatively, an operating person of the work support device 100 may visually recognize the screen on which the camera image appears, and may select, from the AR content database 101, the corresponding AR content in a case where the work target location is photographed in the camera image. As yet another example, a marker corresponding to each work target location may be set in advance in the vicinity of the work target location. In this case, for example, when detecting the marker from a camera image, the work support device 100 reads the identification information described in the marker, and specifies the AR content from the AR content database 101 based on the read identification information.

The display position of the AR content in the camera image is calculated base on, for example, the three-dimensional coordinates associated with the AR content, the estimated position and orientation of the camera 311, and the information indicating the three-dimensional model (three-dimensional map). At this time, the display angle of the AR content in the camera image may also be calculated.

The work support device 100 transmits to the work operator terminal 200b the display position of the specified AR content and the AR content data. The work operator terminal 200b superposes and displays the AR content on the camera image displayed on the display 313 based on the information on the received display position (step S24). Thus, for example, the AR content is displayed in a state in which the work target location in the camera image is accurately pointed.

Figure 4:
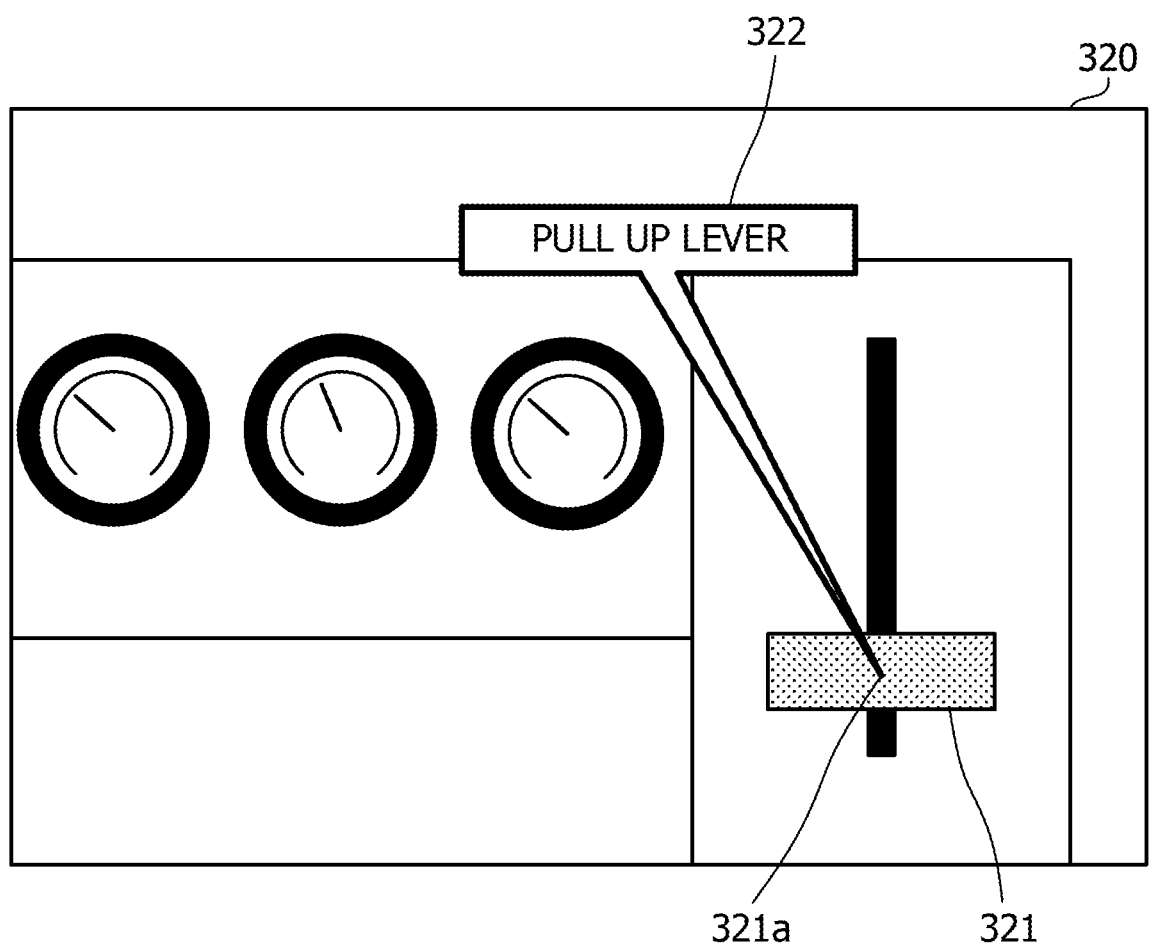
FIG. 4 is a diagram illustrating a display example of AR content in a camera image.

FIG. 4 is a diagram illustrating a display example of the AR content in a camera image. A lever 321 is in an image 320 illustrated in FIG. 4 as a work target location, and the AR content 322 corresponding to the lever 321 is superposed and displayed. In this example, in the AR content database 101, the coordinates of the center portion 321a of the lever 321 are registered as the three-dimensional coordinates of the work target location and, and the AR content 322 is displayed as an image indicating the central portion 321a. It is possible to support the work of the work operator 402 by superposing and displaying such AR content on the camera image.

Next, referring to FIG. 3, the authoring work phase will be described. In the authoring work phase, for example, the following process is performed. First, a three-dimensional model that reproduces the three-dimensional shape of the work site is created (step S11). In this work, a three-dimensional map is created in which three-dimensional coordinates of a large number of feature points set on the three-dimensional model are registered. Next, the position of each work target location in the coordinate space of the three-dimensional model is specified (step S12). Next, AR content corresponding to each work target location is created, and the created AR content and the three-dimensional coordinates in the three-dimensional model of the work target location corresponding thereto are registered in the AR content database 101 (step S13).

In these processes, if, in particular, the process of specifying the work target location in step S12 is performed according to the operation by an operating person, it takes much time and effort, and the specifying process may not be performed accurately. In a specifying method, for example, while the operating person visually recognizes an image of a camera held by the work operator, the operating person determines a work target location in the image, and registers the position information. However, in this method, the operating person has to accurately determine facilities and devices which are to be work targets, and accurately designate the position indicating the work target location. The operating person has to have advanced knowledge in determining the work target location. It may be difficult for the operating person to accurately determine a work target location, and to specify the position accurately depending on the shape and color of the work target location, furthermore, the standing position and orientation of the work operator at the time of photographing the image.

In this embodiment, the work operator is caused to actually perform work at the work site for the authoring work. At this time, the work operator is caused to carry a work operator terminal 200a. The work operator terminal 200a collects various detection values indicating the movement of the work operator, and transmits the detection values to the work support device 100. The work support device 100 constructs the AR content database 101 based on these detection values. In this construction process, the process of step S12 is automated. As a result, the authoring work may be made much more efficient, and the accuracy of the work may be improved.

For example, among the processes in the authoring work phase illustrated in FIG. 3, the process of step S11 is performed by the work operator terminal 200a, and the process of steps S12 and S13 is performed by the work support device 100. In step S11, the work operator terminal 200a performs a simultaneous localization and mapping (SLAM) process using a camera and a depth sensor same as the camera 311 and the depth sensor 312 illustrated in FIG. 2 to estimate the position and orientation of the camera, and to create a three-dimensional model corresponding to the work site. In this process, since the three-dimensional model is created in real time as the work operator's work progresses, it is possible to streamline the creation work and shorten the creation work time.

In step S12, the work support device 100 automatically specifies the three-dimensional coordinates of the work target location using the created three-dimensional model, and the estimation result of the position of the work operator and the line-of-sight of the work operator based on the detection value in the work operator terminal 200a. In this process, a candidate of the location registered eventually in the AR content database 101 as the work target locations may be specified. The authoring work may be made much more efficient, and the accuracy of the work may be improved by automating the process of step S12.

Finally, in step S13, the AR content corresponding to the specified work target location is created by the operation of the operating person of the work support device 100. In this process, for example, voices are exchanged between the work operator and the operating person. While talking with the work operator, the operating person may input text information to be described in the AR content, such as work content and precautions for work.

Figure 5:
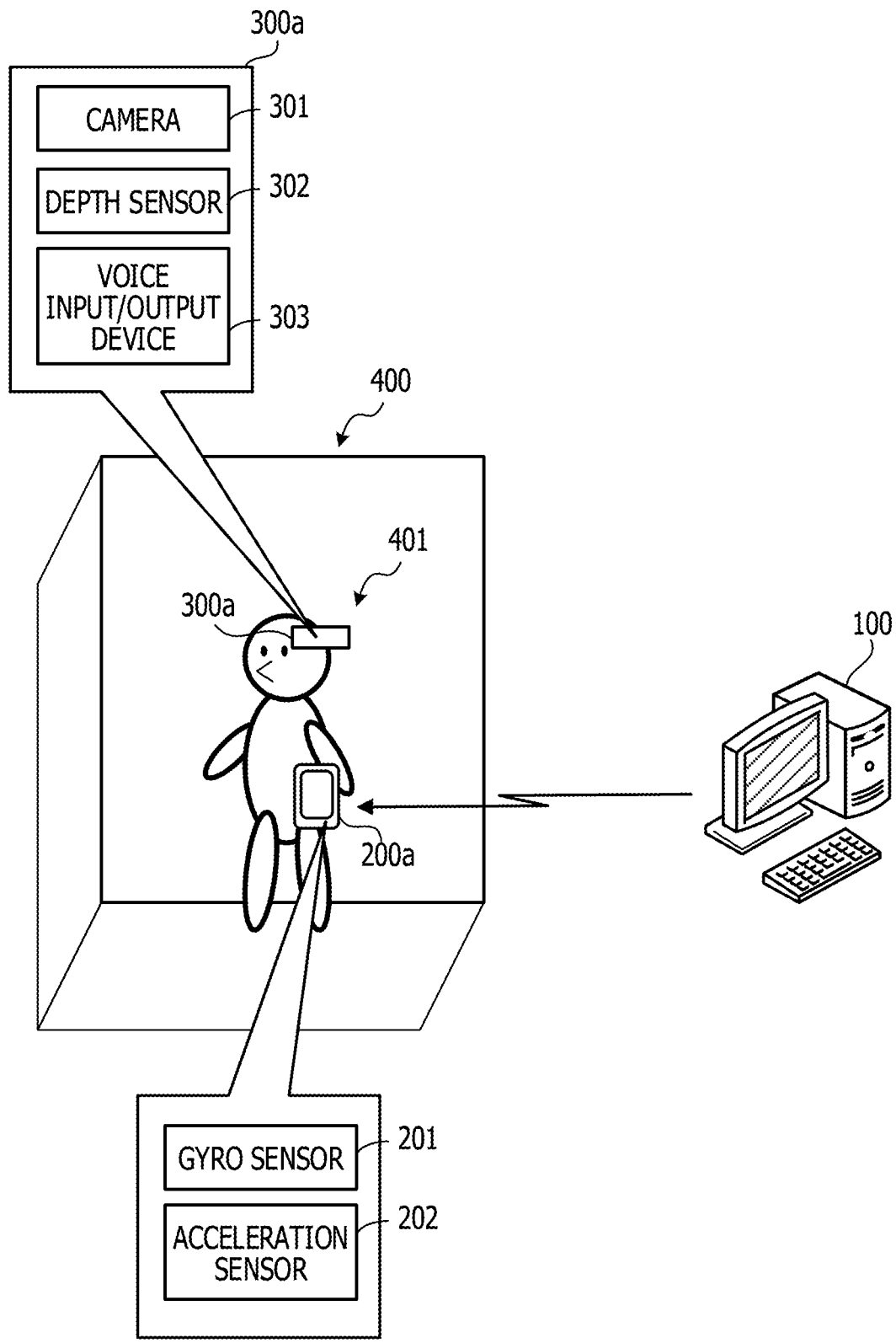
FIG. 5 is a diagram illustrating an example of a configuration of a device used in an authoring work phase.

The process of steps S12 and S13 may be performed in a device dedicated to authoring, which is different from the work support device 100. FIG. 5 is a diagram illustrating an example of a configuration of a device used in the authoring work phase. In the authoring work phase, a head mount unit 300a illustrated in FIG. 5 is used in addition to the work support device 100 and the work operator terminal 200a described above. The work support device 100 and the work operator terminal 200a are communicable to each other, for example, via a network. The work operator terminal 200a and the head mount unit 300a are communicable to each other, for example, by short-range wireless communication.

A work operator 401 carries the work operator terminal 200a, and performs actual work at a work site 400 with the head mount unit 300a attached to the head. The head mount unit 300a includes a camera 301, a depth sensor 302 and a voice input/output device 303.

The camera 301 captures a region in a direction substantially same as the direction of the line-of-sight of the work operator 401. The depth sensor 302 measures the depth for each pixel of the output image from the camera 301 with respect to the region photographed by the camera 301. For example, RGB-D data including image data of a color image obtained by the camera 301 and depth data obtained by the depth sensor 302 is output from such a head mount unit 300a.

The work operator terminal 200a performs an SLAM process based on the image data received from the head mount unit 300a and the depth data to create a three-dimensional model reproducing the three-dimensional shape of the work site 400 to estimate the position and orientation of the camera 301. The work operator terminal 200a transmits to the work support device 100 data of a three-dimensional map illustrating the created three-dimensional model, and the data of the estimated position and orientation, together with the image data of the camera image and the depth data.

The voice input/output device 303, which includes a microphone and a speaker, picks up a voice created by the work operator 401, and transmits the voice to the work operator 401. As will be described later, the voice data picked up by the voice input/output device 303 is transmitted to the work support device 100 via the work operator terminal 200a. As a result, the voice of the work operator 401 is transmitted to the operating person of the work support device 100. The data of the operating person's voice is transmitted from the work support device 100 to the voice input/output device 303 via the work operator terminal 200a. As a result, the voice of the operating person is transmitted to the work operator 401.

The work operator terminal 200a, includes a gyro sensor 201 and an acceleration sensor 202 as a sensor for detecting the moving state of the work operator 401. The work operator terminal 200a transmits the detection values by these sensors to the work support device 100.

Figure 6A:
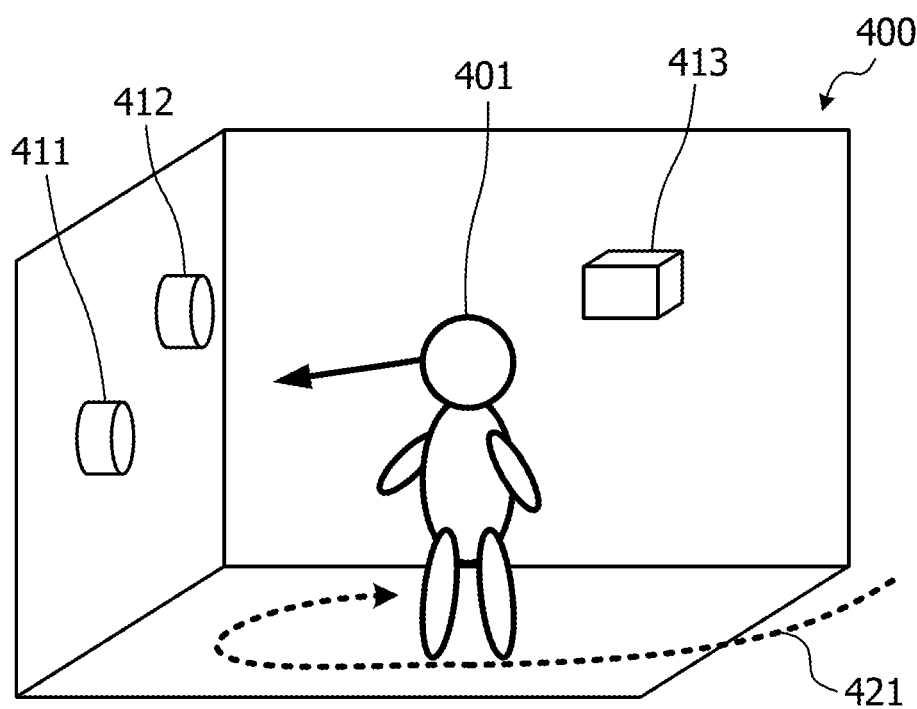
FIGS. 6A and 6B are diagrams for describing an outline of a process of specifying a work target location by a work support device.
Figure 6B:
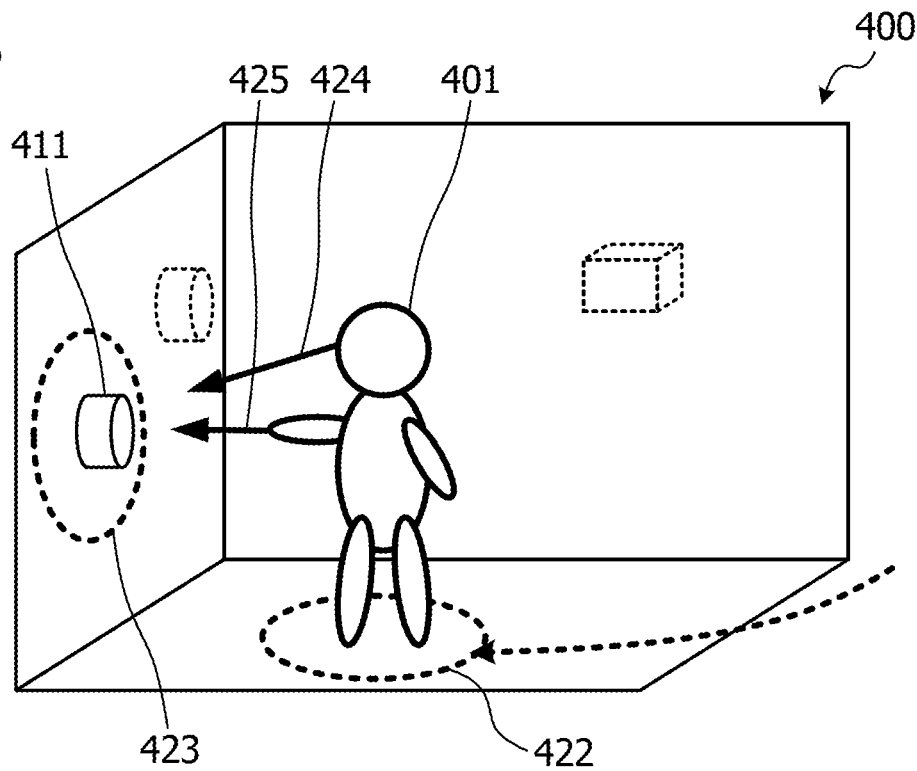

The process by the work support device 100 will be described with reference to FIG. 6 below. FIG. 6 (i.e. FIGS. 6A and 6B) is a diagram for describing an outline of a process of specifying a work target location by the work support device. FIG. 6A illustrates an example of the position of the work target location in the work site. FIG. 6B illustrates the relationship between the movement of the work operator and the process of specifying the work target location.

In FIG. 6A, as an example, three work target locations 411, 412, and 413 are present in the work site 400. As indicated by a dotted arrow 421, the work operator 401 enters the work site 400, moves in the work site 400, and performs predetermined work on each of the work target locations 411, 412, and 413. In this case, in the authoring work, the three-dimensional coordinates of each of the work target locations 411, 412, and 413 are registered in the AR content database 101.

The work support device 100 performs the following process based on the information received from the work operator terminal 200a. First, the work support device 100 monitors the moving state of the work operator 401 based on the detection results by the gyro sensor 201 and the acceleration sensor 202. The work support device 100 determines, based on the monitoring result of the moving state, that the work operator 401 has reached a region (work region) where the work operator 401 performs work for a certain work target location. When performing work, it is probable that the position of the work operator 401 hardly move. Therefore, the work support device 100 determines, based on the monitoring result of the moving state, that the work operator has reached the work region in a case where it is determined that the work operator 401 has come to rest.

In FIG. 6B, as an example, it is determined that the work operator 401 has reached the work region 422 for working on a work target location 411. The work support device 100 estimates a work target region 423 on the three-dimensional model based on the direction of interest of the work operator 401. The direction of interest is, for example, the direction of the line-of-sight of the work operator 401. In FIG. 6B, the line-of-sight of the work operator 401 is indicated by an arrow 424.

The work target region 423 is estimated as a three-dimensional region including the work target location 411. For example, in the work target region 423 is estimated as a group of feature points included in the three-dimensional region including the work target location 411 among the feature points on the three-dimensional model. Therefore, the feature points presumed to be present in the vicinity of the work target location 411 are narrowed down from the feature points on the three-dimensional model by estimating the work target region 423.

For example, in a case where it is detected that the work operator 401 is performing a pointing operation with respect to the work target location 411, the work target region 423 may be estimated based on the pointing direction in addition to the direction of interest of the work operator 401. In FIG. 6B, the pointing direction of the work operator 401 is indicated by an arrow 425.

Next, based on the geometric shape and color information of the three-dimensional model included in the work target region 423, the work support device 100 cuts out a shape of the work target location 411, and specifies the three-dimensional coordinates (for example, coordinates of the center of gravity) of the work target location 411. Through the above processing, the position of the work target location 411 on the three-dimensional space is automatically specified.

Figure 7:
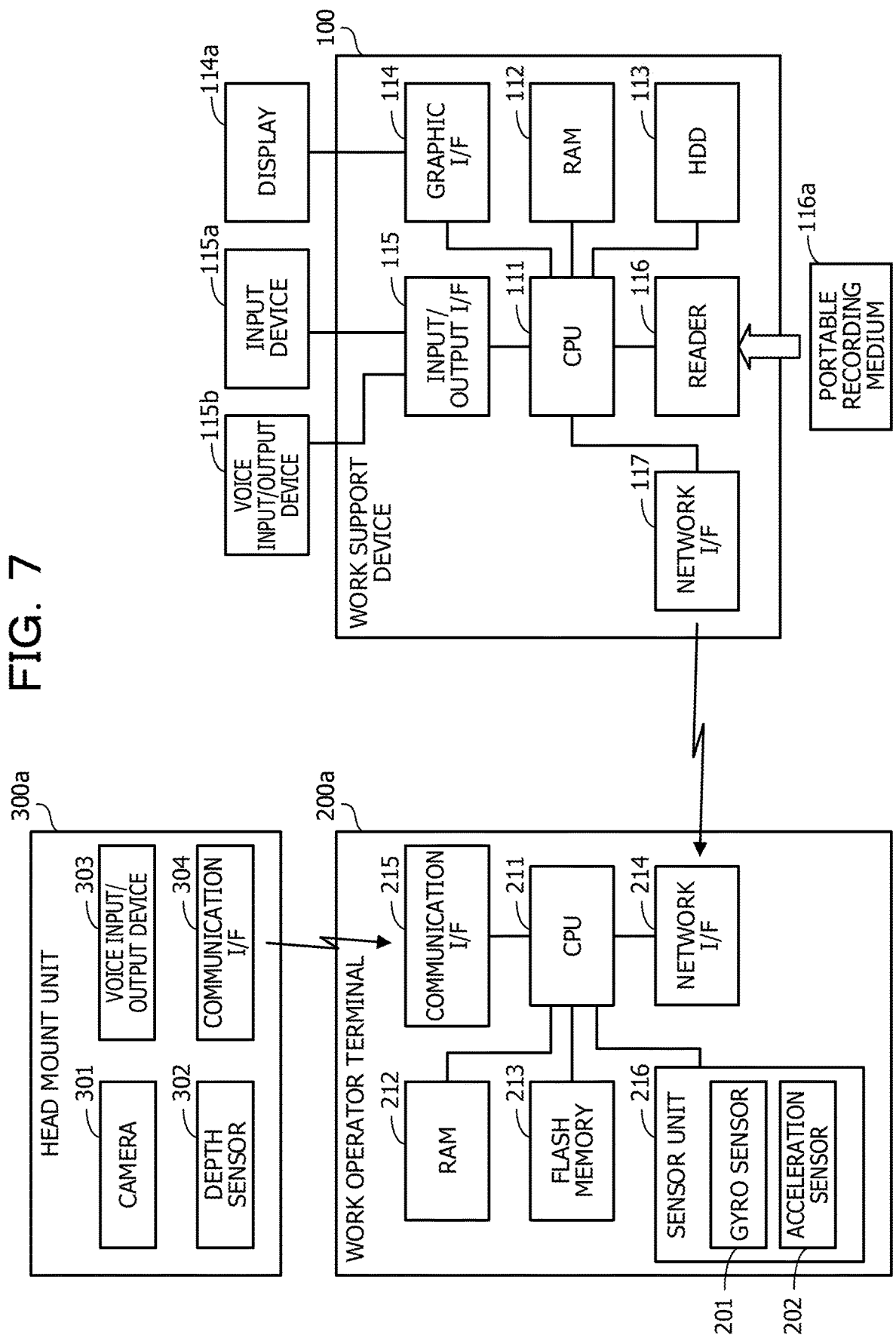
FIG. 7 is a diagram illustrating a example of a hardware configuration of each device used in an authoring work phase.

Next, the work operator terminal 200a and the work support device 100 will be described in detail. FIG. 7 is a diagram illustrating a example of a hardware configuration of each device used in an authoring work phase.

The work operator terminal 200a includes, for example, a central processing unit (CPU) 211, a RAM 212, a flash memory 213, a network interface (I/F) 214, a communication interface (I/F) 215 and a sensor unit 216.

The CPU 211 performs centralized control of the entire work operator terminal 200a in accordance with the program. The CPU 211 includes, for example, one or more processors. The RAM 212 is used as a main storage device of the work operator terminal 200a. The RAM 212 temporarily stores at least part of an operating system (OS) program and an application program both of which are executed by the CPU 211. The RAM 212 stores various data which is used for processing by the CPU 211.

The flash memory 213 is used as an auxiliary storage device of the work operator terminal 200a. The flash memory 213 stores an OS program, an application program, and various data. Other types of nonvolatile storage devices such as an HDD may be used as the auxiliary storage device.

The network interface 214 transmits and receives data to and from the work support device 100 via a network. The communication interface 215 is, for example, an interface device for short-range wireless communication, and transmits and receives data to and from the head mount unit 300a by wireless communication. A method such as Bluetooth (registered trademark) or the like may be used as a short-range wireless communication method.

The sensor unit 216 includes the above-described gyro sensor 201 and acceleration sensor 202. Detection values by these sensors are transmitted to the CPU 211. The head mount unit 300a includes a communication interface (I/F) 304 in addition to the camera 301, the depth sensor 302 and the voice input/output device 303. The communication interface 304 transmits and receives data to and from the communication interface 215 of the work operator terminal 200a by wireless communication.

The work support device 100 includes, for example, a CPU 111, a RAM 112, an HDD 113, a graphic interface (I/F) 114, an input interface (I/F) 115, a reader 116 and a network interface (I/F) 117.

The CPU 111 performs centralized control of the entire work support device 100 in accordance with the program. The CPU 111 includes, for example, one or more processors. The RAM 112 is used as a main storage device of the work support device 100. The RAM 112 temporarily stores at least part of an OS program and an application program both of which are executed by the CPU 111. The RAM 112 stores various data which is used for processing by the CPU 111.

The HDD 113 is used as an auxiliary storage device of the work support device 100. The HDD 113 stores an OS program, an application program, and various data. Other types of nonvolatile storage devices such as a solid state drive (SSD) may also be used as the auxiliary storage device.

A display 114a is connected to the graphic interface 114. The graphic interface 114 causes the display 114a to display the image in accordance with an instruction from the CPU 111. Examples of the display 114a include a liquid crystal display and an organic electroluminescence (EL) display.

An input device 115a is connected to the input interface 115. The input interface 115 transmits a signal output from the input device 115a to the CPU 111. Examples of the input device 115a include a keyboard and a pointing device. Examples of the pointing device include a mouse, a touch panel, a tablet, a touch pad, and a track ball.

A portable recording medium 116a is removably attached to the reader 116. The reader 116 reads the data recorded on the portable recording medium 116a and transmits the read data to the CPU 111. Examples of the portable recording medium 116a include an optical disc, a magneto-optical disc, and a semiconductor memory.

Figure 8:
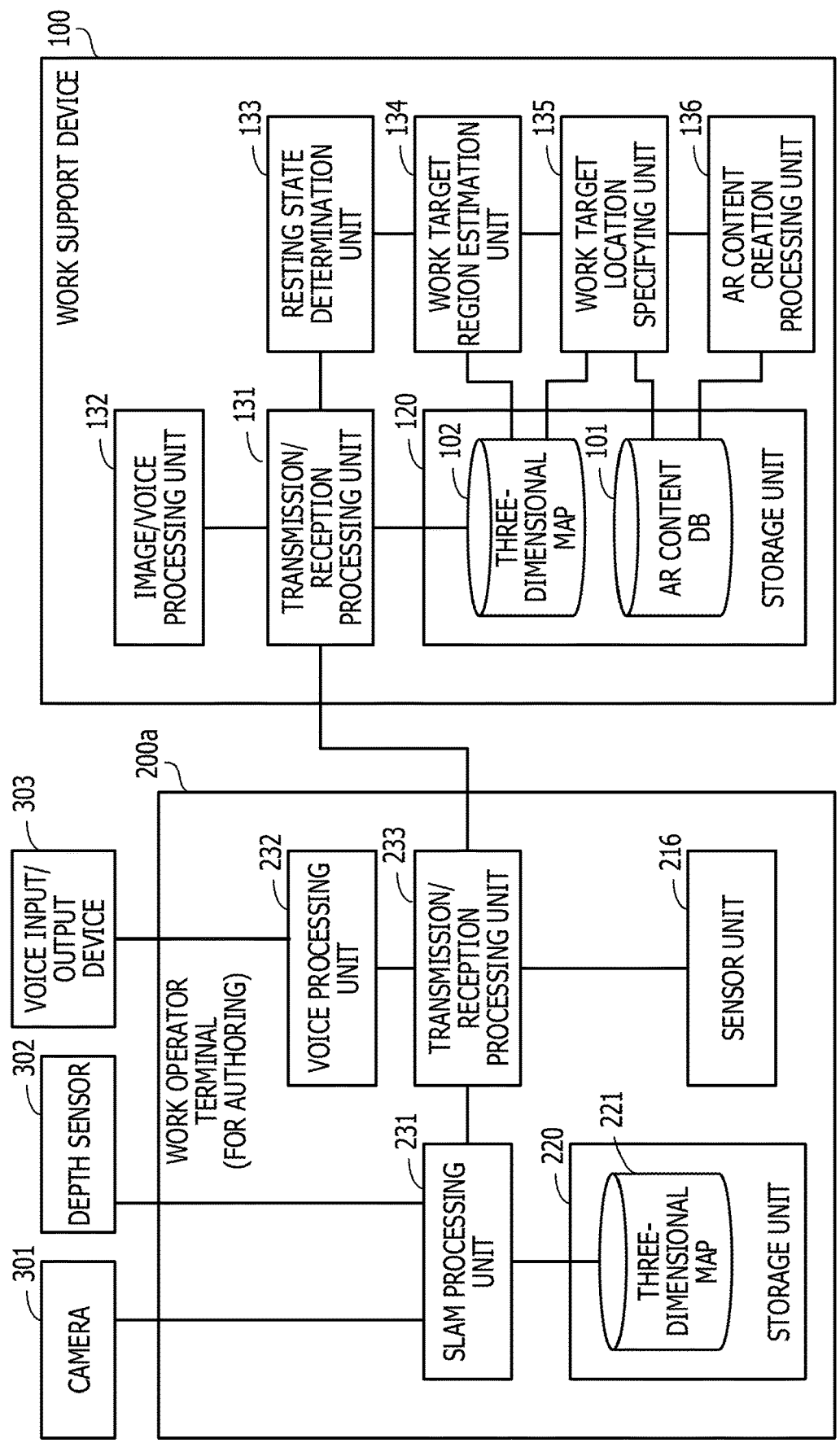
FIG. 8 is a block diagram illustrating an example of a configuration of a processing function of a work operator terminal and a work support device.

The network interface 117 transmits and receives data to and from the work operator terminal 200a via a network. FIG. 8 is a block diagram illustrating an example of a configuration of a processing function of the work operator terminal and the work support device.

The work operator terminal 200a includes a storage unit 220, the SLAM processing unit 231, a voice processing unit 232 and a transmission/reception processing unit 233. The storage unit 220 is constructed as a storage area of a storage device, such as the RAM 212 and the flash memory 213, which is included in the work operator terminal 200a. The processes by the SLAM processing unit 231, the voice processing unit 232, and the transmission/reception processing unit 233 are implemented by the CPU 211 executing a predetermined application program.

The storage unit 220 stores a three-dimensional map 221. Data indicating a three-dimensional model reproducing the three-dimensional shape of the work site is registered in the three-dimensional map 221. For example, three-dimensional coordinates, feature quantity and color information (RGB information) are registered for each feature point included in the three-dimensional model in the three-dimensional map 221.

The SLAM processing unit 231 perform the SLAM process based on image data output from the camera 301, the depth data output from the depth sensor 302, and the three-dimensional map 221. In the SLAM process, a three-dimensional model for the work site is created, and the position and orientation of the camera 301 is estimated. When extracting a new feature point, the SLAM processing unit 231 additionally registers data on the feature points in the three-dimensional map 221.

The voice processing unit 232 supplies data of the work operator's voice picked up by the voice input/output device 303 to the transmission/reception processing unit 233. The voice processing unit 232 outputs the data of the operating person's voice input from the transmission/reception processing unit 233 to the voice input/output device 303, and causes the voice input/output device 303 to output the voice of the operating person.

The transmission/reception processing unit 233 transmits the data input from the SLAM processing unit 231 to the work support device 100. For example, image data of a camera image, data on a feature point newly registered in the three-dimensional map 221, the estimated position and orientation of the camera 301, and the data detected by each sensor in the sensor unit 216 is transmitted to the work support device 100. The transmission/reception processing unit 233 transmits the data of the work operator's voice input from the voice processing unit 232 to the work support device 100. The transmission/reception processing unit 233 outputs the data of the operating person's voice received from the work support device 100 to the voice processing unit 232.

On the other hand, the work support device 100 includes a storage unit 120, a transmission/reception processing unit 131, an image/voice processing unit 132, a resting state determination unit 133, a work target region estimation unit 134, a work target location specifying unit 135 and an AR content creation processing unit 136.

The storage unit 120 is constructed as a storage area of a storage device, such as the RAM 112 or the HDD 113, which is included in the work support device 100. The processes by the transmission/reception processing unit 131, the image/voice processing unit 132, the resting state determination unit 133, the work target region estimation unit 134, the work target location specifying unit 135 and the AR content creation processing unit 136 are, for example, implemented by the CPU 111 executing a predetermined application program.

The storage unit 120 stores the AR content database 101 and a three-dimensional map 102. The data same as that of the three-dimensional map 221 in the work operator terminal 200a is registered in the three-dimensional map 102.

The transmission/reception processing unit 131 receives the data transmitted from the transmission/reception processing unit 233 of the work operator terminal 200a. The transmission/reception processing unit 131 registers the data of the feature points received from the work operator terminal 200a in the three-dimensional map 102. As a result, the contents registered in the three-dimensional map 102 are the same as the contents registered in the three-dimensional map 221. The transmission/reception processing unit 131 outputs the image data and the voice data received from the work operator terminal 200a to the image/voice processing unit 132. The transmission/reception processing unit 131 transmits the data of the operating person's voice input from the image/voice processing unit 132 to the work operator terminal 200a.

The image/voice processing unit 132 outputs the image data input from the transmission/reception processing unit 131 to the display 114a, and causes the display 114a to display the camera image. The image/voice processing unit 132 outputs the voice data input from the transmission/reception processing unit 131 to a voice input/output device 115b, and causes the voice input/output device 115b to output the work operator's voice. The image/voice processing unit 132 outputs the data of the operating person's voice picked up by the voice input/output device 115b to the transmission/reception processing unit 131.

The resting state determination unit 133 acquires the data detected by each sensor in the sensor unit 216 from the transmission/reception processing unit 131. The resting state determination unit 133 determines, based on the detection data, whether the work operator has been in a resting state. The resting state is a state in which the position of the work operator hardly moves. When the work operator is in a resting state, it is determined that the work operator has reached a work region where the work operator performs work on a work target location.

The work target region estimation unit 134 calculates an interest direction vector of the work operator based on the position and orientation of the camera 301 during the period in which the work operator is in a resting state. Based on the data of the group of feature points which is present in the vicinity of the direction of interest and which is registered in the three-dimensional map 102, the work target region estimation unit 134 calculates the pointing direction vector in a case where it is detected that the work operator performs the pointing operation. The work target region estimation unit 134 calculates an average vector obtained by averaging these vectors, and estimates the work target region by performing the interference check between a straight line along the direction of the average vector when the work operator is placed as a starting point and the three-dimensional model based on the three-dimensional map 102.

Based on the geometric shape and color information of the three-dimensional model in the estimated work target region, the work target location specifying unit 135 specifies the three-dimensional model of an object (facility or device) to be a work target, and specifies the three-dimensional coordinates of the work target location based on the specified result. The work target location specifying unit 135 registers the three-dimensional coordinates of the specified work target location in the AR content database 101.

The AR content creation processing unit 136 creates AR content to display for each of the specified work target locations according to the operation by the operating person, and registers the created AR content in the AR content database 101 in association with the work target location.

Figure 9:
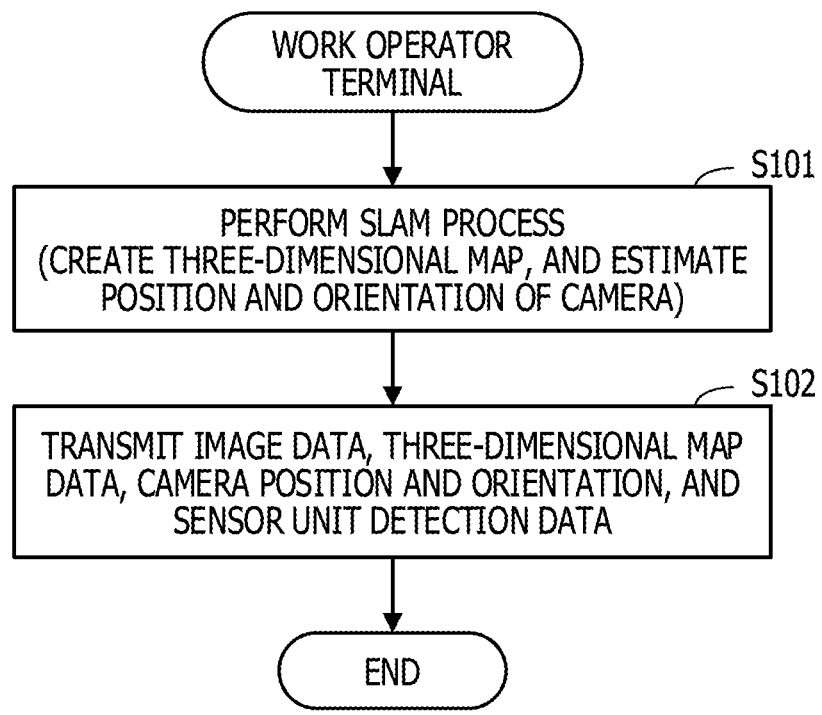
FIG. 9 is an example of a flowchart illustrating a procedure of a process performed by a work operator terminal.

Next, the process by the work operator terminal 200a will be described. FIG. 9 is an example of a flowchart illustrating a procedure of a process performed by the work operator terminal. The work operator terminal 200a performs the process in FIG. 9 each time the image data of the camera image of one frame is input together with the depth data.

[step S101] The SLAM processing unit 231 performs the SLAM process based on the image data of the camera image, the depth data, and the three-dimensional map 221. In the SLAM process, a three-dimensional model for the work site is created and the position and orientation of the camera 301 are estimated. In a case where a new feature point is extracted, the SLAM processing unit 231 adds three-dimensional coordinates, feature quantity, and color information with regard to the feature point to the three-dimensional map 221.

[step S102] The transmission/reception processing unit 233 acquires the image data of the camera image, and the estimated position and orientation of the camera 301 from the SLAM processing unit 231, and transmits them to the work support device 100. In a case where a new feature point is extracted in step S101, the transmission/reception processing unit 233 acquires data corresponding to the feature point from the three-dimensional map 221, and transmits the acquired data to the work support device 100. The transmission/reception processing unit 233 acquires detection data from the gyro sensor 201 and the acceleration sensor 202 in the sensor unit 216, and transmits the detection data to the work support device 100.

Figure 10:
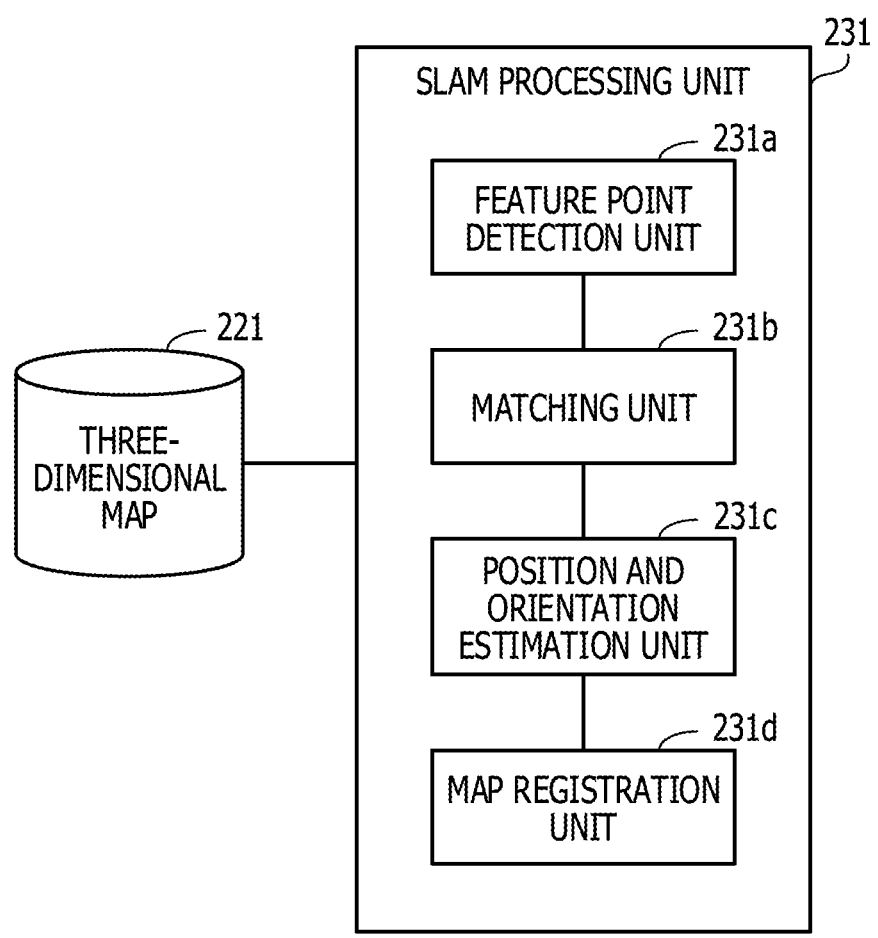
FIG. 10 is a diagram illustrating an example of an internal configuration of a SLAM processing unit.

FIG. 10 is a diagram illustrating an example of an internal configuration of the SLAM processing unit 231. With reference to FIG. 10, the process of step S101 in FIG. 9 will be described. The SLAM processing unit 231 includes, for example, a feature point detection unit 231a, a matching unit 231b, a position and orientation estimation unit 231c and a map registration unit 231d.

The feature point detection unit 231a extracts a plurality of feature points from the input camera image. The matching unit 231b performs a process of matching each extracted feature point with the feature points registered in the three-dimensional map 221. In this matching process, for example, a feature point matching process may be performed between a camera image and a plurality of key frames. A key frame is an image selected from the camera images that succeeded in estimating the position and orientation of the camera 301 in the past based on the condition that the difference between the photographing times is equal to or longer than the predetermined time.

The position and orientation estimation unit 231c estimates the position and orientation of the camera 301 based on the result of the matching process. The data of the position and orientation is output to the transmission/reception processing unit 233. The position of the camera 301 approximates the position of the work operator (for example, the position of the viewpoint of the work operator), and the orientation of the camera 301 approximates the direction of the work operator (for example, the direction of interest of the work operator).

The map registration unit 231d additionally registers data on a new feature point that is not registered in the three-dimensional map 221 among the feature points extracted from the camera image in the three-dimensional map 221. For example, three-dimensional coordinates, feature quantity, and color information are registered as data on feature points.

In the present embodiment, as described above, the position and the direction of interest of the work operator are estimated using sensor devices (camera 301, and depth sensor 302) carried by a work operator. However, the position and the direction of interest of the work operator may be detected by other methods. For example, in a case where a three-dimensional map corresponding to a work site is prepared in advance, one or more set of cameras and depth sensors may be fixedly installed at the work site. The position and the direction of interest of the work operator may be estimated based on the data detected by these sensor devices, and a three-dimensional map prepared in advance.

Figure 11:
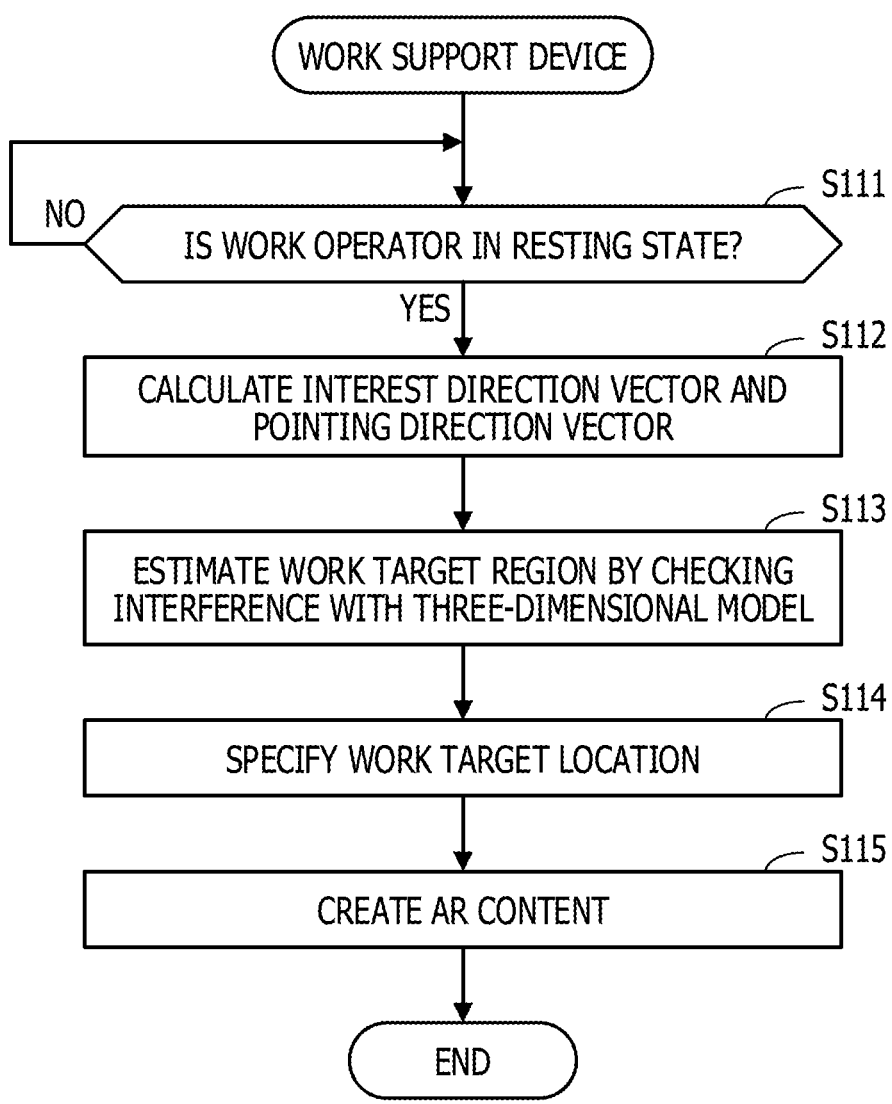
FIG. 11 is an example of a flowchart illustrating a procedure of a process performed by a work support device.

Next, the process by the work support device 100 will be described. FIG. 11 is an example of a flowchart illustrating a procedure of a process performed by the work support device.

[step S111] The resting state determination unit 133 acquires the data detected by the sensor unit 216 from the transmission/reception processing unit 131, and determines, based on this detection data, whether the work operator is in a resting state. In a case where it is determined that the work operator is in a resting state, the resting state determination unit 133 performs the process of step S112. On the other hand, in a case where it is determined that the work operator is not in a resting state, the resting state determination unit 133 waits for the transmission/reception processing unit 131 to receive the next data detected by the sensor unit 216, and, when the next detection data is received, performs again the process of step S111 based on the detection data.

[step S112] The work target region estimation unit 134 acquires the position and orientation of the camera 301 from the transmission/reception processing unit 131, and calculates an interest direction vector indicating the direction of interest of the work operator based on this position and orientation. The work target region estimation unit 134 extracts data of a group of feature points which is in the vicinity of the direction of interest (direction of line-of-sight) of the work operator from the groups of feature points registered in the three-dimensional map 102. The work target region estimation unit 134 determines, based on the data of the extracted group of feature points, whether the work operator is performing a pointing operation on the work target location. In a case where it is determined that the pointing operation is being performed, the work target region estimation unit 134 calculates a pointing direction vector indicating the pointing direction.

[step S113] The work target region estimation unit 134 calculates an average vector of the calculated interest direction vector and the pointing direction vector. The work target region estimation unit 134 estimates the work target region by performing the interference check between a straight line along the direction of the average vector when the work operator is placed as a starting point and the three-dimensional model based on the three-dimensional map 102.

[step S114] Based on the geometric shape and color information of the three-dimensional model in the estimated work target region, the work target location specifying unit 135 specifies the three-dimensional model of a facility or an device to be a work target, and specifies the three-dimensional coordinates of the work target location based on the specified result. The work target location specifying unit 135 registers the three-dimensional coordinates of the specified work target location in the AR content database 101.

[step S115] The AR content creation processing unit 136 creates AR content to be displayed on the specified work target location in accordance with the operation by the operating person of the work support device 100. For example, the operating person inputs text information to be described in the AR content, such as work content and precautions for work. At this time, since the operating person may think about the input contents through conversation with the work operator, it is possible to input useful information for the work operator working in the main work phase. For example, the operating person selects from display modes prepared in advance which mode is to be used to display the input text information.

In response to the registration operation by the operating person, the AR content creation processing unit 136 registers, in the AR content database 101, the AR content created in this way in association with the three-dimensional coordinates of the work target location registered in step S114.

Figure 12:
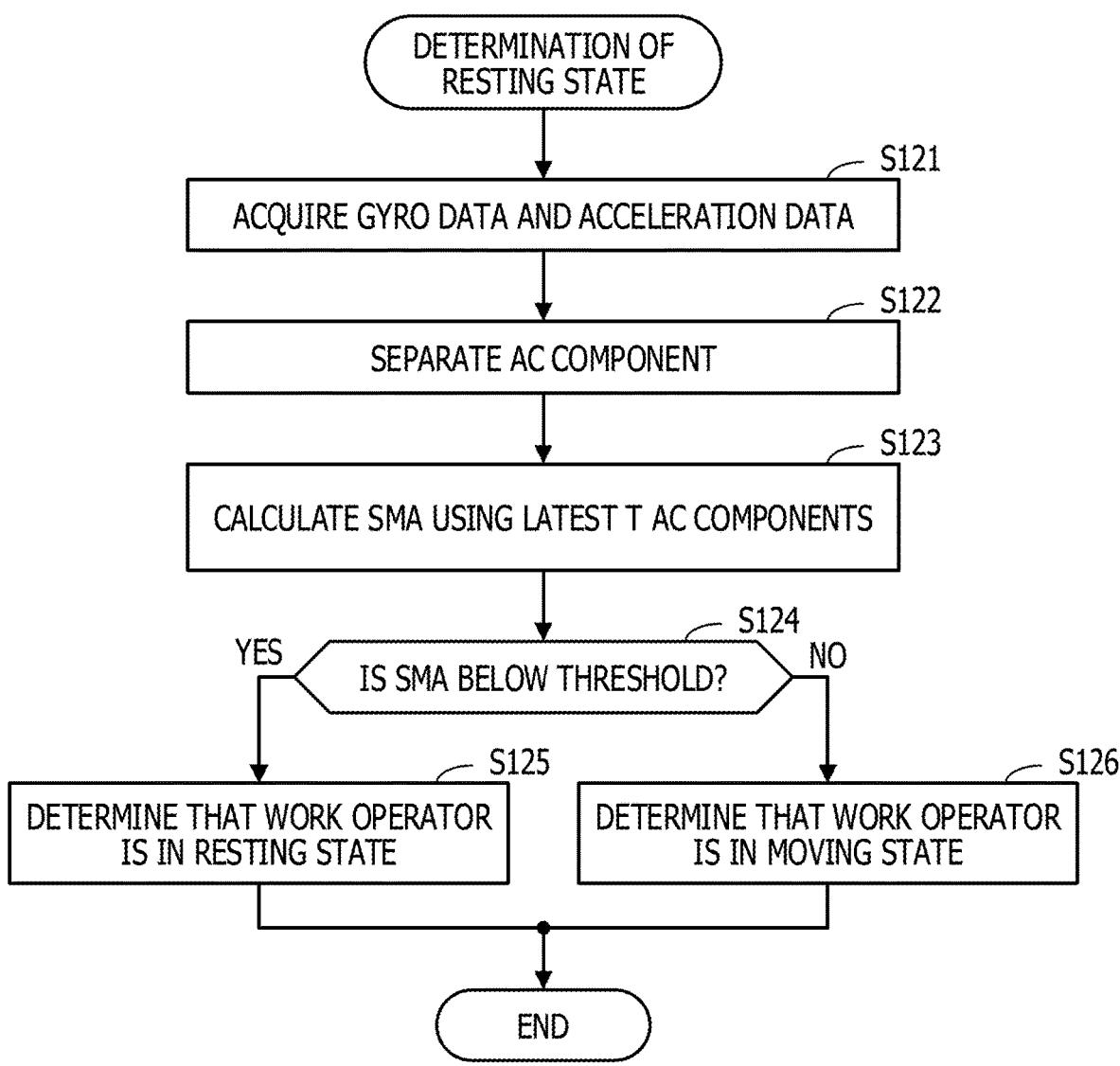
FIG. 12 is an example of a flowchart illustrating a process procedure of determining a resting state.

Next, with reference to FIG. 12 and FIG. 13, the process of determining the resting state in step S111 will be described. FIG. 12 is an example of a flowchart illustrating a process procedure of determining the resting state. The resting state determination unit 133 performs the process in FIG. 12 every time the transmission/reception processing unit 131 receives the data detected by the sensor unit 216 from the work operator terminal 200*a*.

[step S121] The work target region estimation unit 134 acquires the data detected by the sensor unit 216 wherein the data is received by the transmission/reception processing unit 131. For example, the work target region estimation unit 134 acquires gyro data (for example, angular velocity data) detected by the gyro sensor 201, and acceleration data detected by the acceleration sensor 202.

[step S122] The work target region estimation unit 134 separates alternating current (AC) components for each of the acquired gyro data and the acquired acceleration data using a high pass filter.

[step S123] The work target region estimation unit 134 acquires T AC components calculated most recently for each of the acquired gyro data and the acquired acceleration data using a high pass filter. The AC component acquired here includes the AC components separated in step S122. The work target region estimation unit 134 calculates, a signal magnitude area (SMA) for each of the acquired gyro data and the acquired acceleration data using the acquired T AC components.

For example, the SMA using the AC components of three axis acceleration data is calculated by the following expression (1), where i denotes a number sequentially assigned to each of the T AC components, and x(i), y(i), and z(i) indicate the x-axis component, the y-axis component, and the z-axis component of the data of the i-th AC component.

$$\text{SMA} = \Sigma(|x(i)| + |y(i)| + |z(i)|)/T \quad (1)$$

[step S124] The work target region estimation unit 134 compares the calculated SMA with a predetermined threshold. Here, the thresholds TH1 and TH2 are set for the gyro data and the acceleration data, respectively. In a case where the SMA based on the gyro data is less than or equal to the threshold TH1, and the SMA based on the acceleration data is less than or equal to the threshold TH2, the work target region estimation unit 134 performs the process of step S125. On the other hand, in a case where the above condition is not satisfied, the work target region estimation unit 134 performs the process of step S126.

[step S125] The work target region estimation unit 134 determines that the work operator is in a resting state.

[step S126] The work target region estimation unit 134 determines that the work operator is in a moving state (not in a resting state).

In the process in FIG. 11 described above, in step S111, the determination results of steps S125 and S126 are used. It is probable that the work operator's standing position hardly move when the work operator performs work on the work target location. Therefore, in the process in FIG. 11, when the work operator is in a resting state, it is determined that the work operator is in the work region and is performing work. Only in such a state, the process after step S112, that is, the process for specifying the work target location, is performed. Thus, it is possible to specify the work target location with high accuracy. Since of the process of specifying the work target location is stopped in a state where the work is not in progress, the processing load of the work support device 100 may be reduced.

Figure 13:
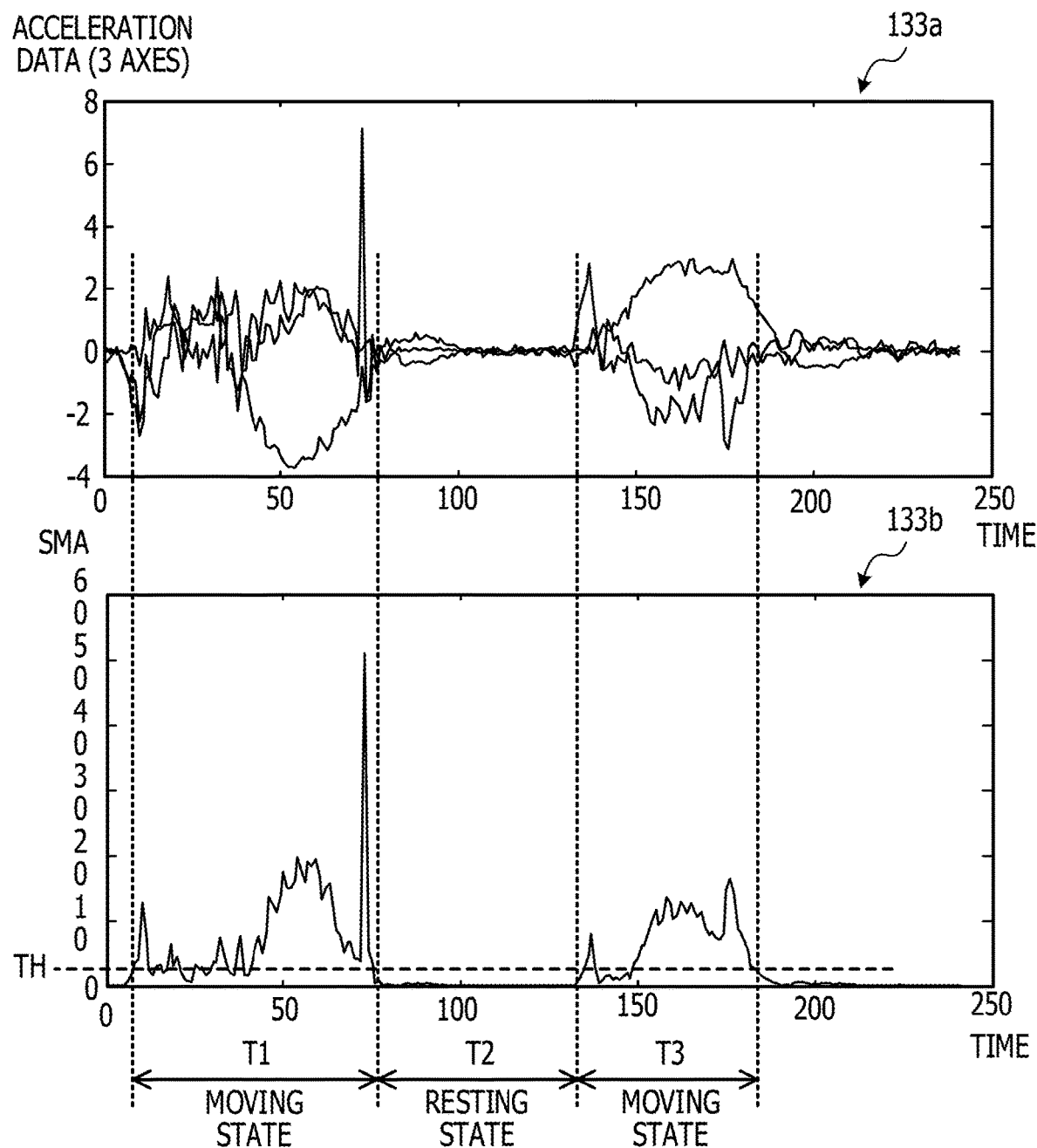
FIG. 13 is a diagram illustrating a determination example of a resting state.

FIG. 13 is a diagram illustrating a determination example of a resting state. In FIG. 13, as an example, the resting state is determined based on three axes acceleration data by the acceleration sensor 202. In FIG. 13, a graph 133a illustrates the transition of the acceleration data, and a graph 133b illustrates the transition of the SMA. In the example of FIG. 13, it is determined that the work operator is in a moving state in the periods T1 and T3, and it is determined that the work operator is in a resting state in the period T2 by comparing the SMA with the threshold TH.

As described above, in the present embodiment, the gyro sensor 201 and the acceleration sensor 202 are used as an example of sensor devices for detecting a moving state of the work operator. However, the sensor device is not limited to these sensors. For example, the moving state of the work operator may be detected based on the position of the camera 301 estimated by the SLAM processing unit 231.

Next, the process by the work target region estimation unit 134 illustrated in steps S112 and S113 in FIG. 11 will be described. In step S112, the work target region estimation unit 134 calculates an interest direction vector indicating the direction of interest of the work operator. In a case where the work operator performs a pointing operation on the work target location, the work target region estimation unit 134 calculates a pointing direction vector indicating the pointing direction.

The interest direction vector and the pointing direction vector are calculated, for example, as a vector having the same size (for example, a unit vector). The direction of the interest direction vector is calculated as the orientation of the orientation of the camera 301 received by the transmission/reception processing unit 131 from the work operator terminal 200a. On the other hand, the pointing direction vector is calculated by the process as illustrated in FIGS. 14 and 15 below.

Figure 14:
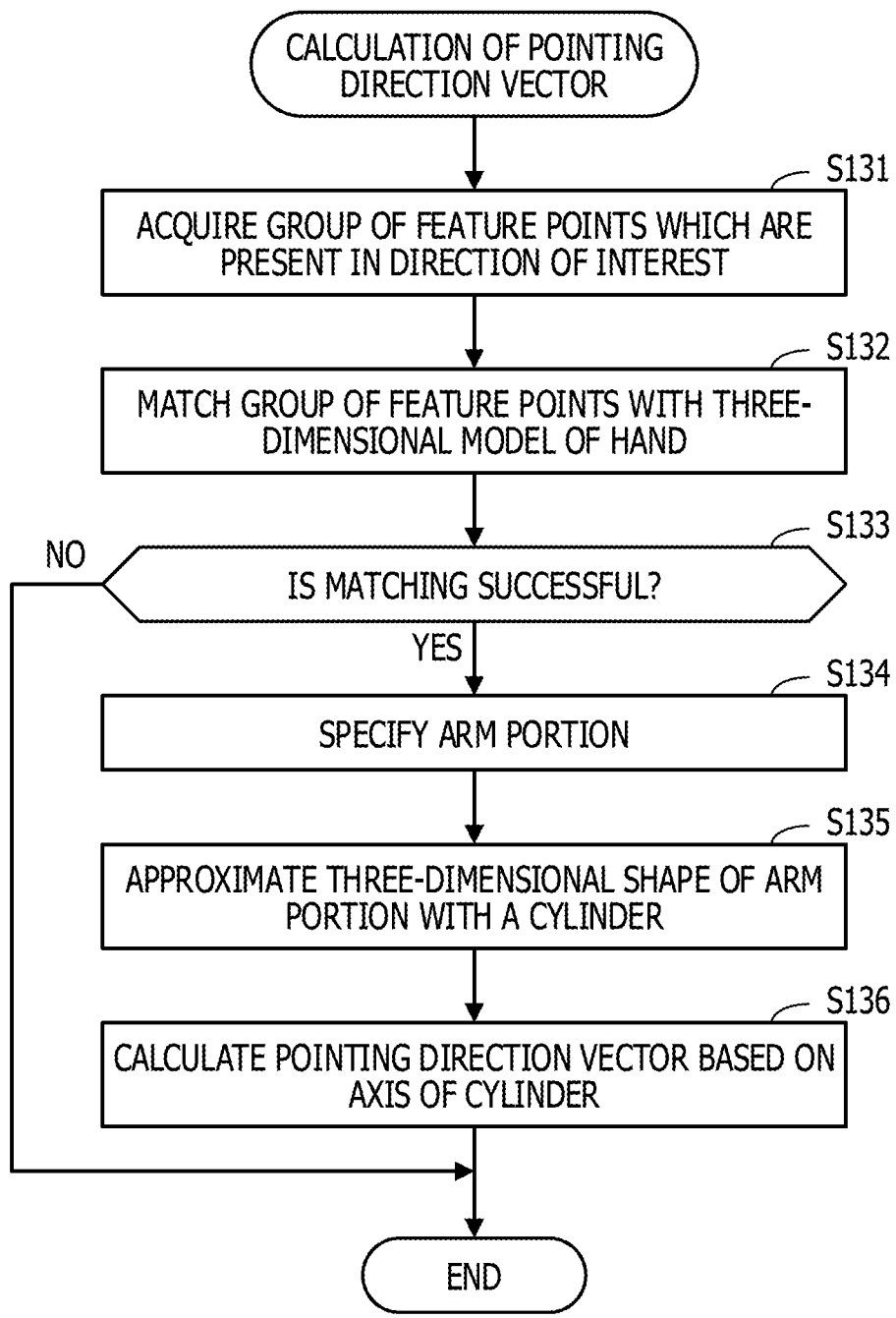
FIG. 14 is an example of a flowchart illustrating a procedure of calculating a pointing direction vector.
Figure 15:
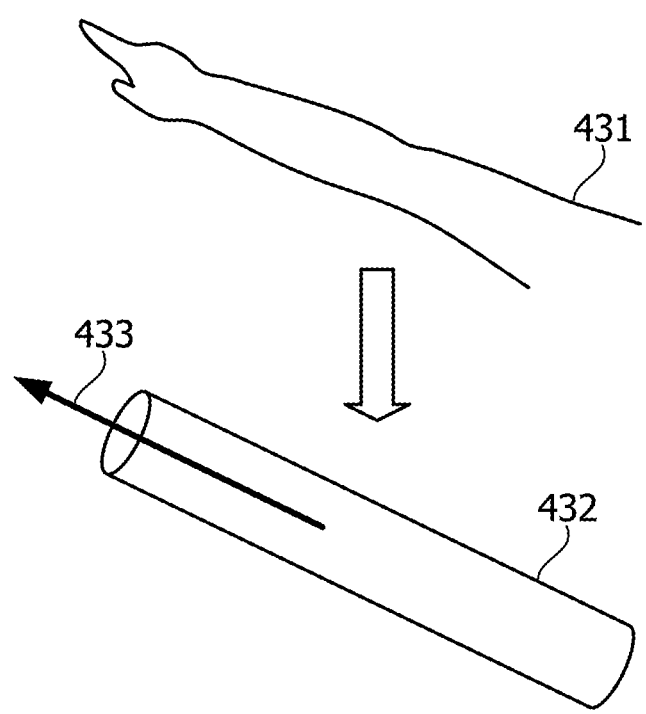
FIG. 15 is a diagram illustrating an example of a three-dimensional model of a hand and a cylinder.

FIG. 14 is an example of a flowchart illustrating the procedure of calculating the pointing direction vector. FIG. 15 is a diagram illustrating an example of a three-dimensional model of a hand and a cylinder.

[step S131] The work target region estimation unit 134 acquires, from the three-dimensional map 102, data of a group of feature points which is present in the direction of interest (the direction of the line-of-sight) of the work operator. In this process, the work target region estimation unit 134 acquires the data of the group of feature points in the camera image from the three-dimensional map 102 based on, for example, the position and orientation of the camera 301, and the camera parameters of the camera 301 obtained beforehand.

[step S132] The work target region estimation unit 134 matches the group of feature points acquired in step S131 with the three-dimensional model of hand prepared in advance. As a three-dimensional model of the hand, for example, a model illustrating the shape from the arm to fingertips is used as in the three-dimensional model 431 illustrated in FIG. 15. As the matching process, for example, an iterative closet points (ICP) algorithm may be used.

[step S133] In a case where the matching is successful, that is, in a case where the pointing operation is detected, the work target region estimation unit 134 performs the process of step S134, and in a case the where matching is not successful, the work target region estimation unit 134 ends the process of calculating the pointing direction vector.

[step S134] The work target region estimation unit 134 specifies the arm portion (region from elbow to fingertips) from the matching result.

[step S135] The work target region estimation unit 134 approximates the three-dimensional shape of the specified arm portion by a cylindrical shape model 432 as illustrated in FIG. 15.

[step S136] The work target region estimation unit 134 calculates a pointing direction vector that has a direction same as that of the axis of the approximated cylindrical shape model 432 and which has a predetermined size (the size same as that of the interest direction vector). In FIG. 15, the direction of the axis of the cylindrical shape model 432, that is, the direction of the pointing direction vector, it is denoted by an arrow 433.

Figure 16:
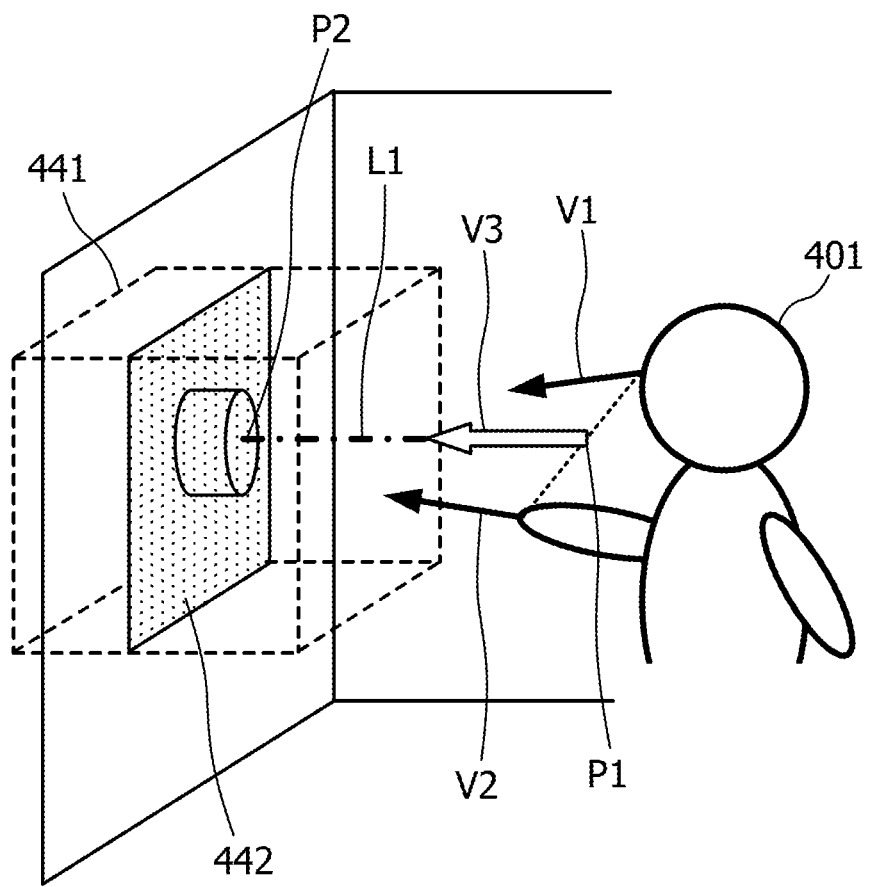
FIG. 16 is a diagram illustrating an example of a process of estimating a work target region based on a vector.

FIG. 16 is a diagram illustrating an example of a process of estimating a work target region based on a vector. With reference to FIG. 16, a example of the process of step S113 in FIG. 11 will be described. The work target region estimation unit 134 calculates an average vector V3 obtained by averaging an interest direction vector V1 and a pointing direction vector V2. The work target region estimation unit 134 calculates an intermediate point P1 between the position of the work operator's eyes, and the position of the work operator's fingertips. The position of the eyes is specified as the position of the camera 301, and the position of the fingertip is specified from the three-dimensional model of the hand successfully matched in the process in FIG. 14.

The work target region estimation unit 134 sets a straight line L1 extending in the direction of the average vector V3 by setting the intermediate point P1 as a starting point. However, in a case where the pointing operation is not detected, the work target region estimation unit 134 sets a straight line L1 extending in the direction of the average vector V1 by setting the position of the work operator's eyes as a starting point. The work target region estimation unit 134 specifies the intersection P2 at which the set straight line L1 and the group of feature points of the three-dimensional model registered in the three-dimensional map 221 intersects, and sets a certain three-dimensional region centered on the intersecting point P2 as a work target region. In the example of FIG. 16, a cube 441 inscribed at a position with respective certain distances in the three axis directions centered the intersection point P2 is set as the work target region.

A group of feature points 442 of the three-dimensional model included in the set work target region is used by the work target location specifying unit 135 in step S114 in FIG. 11. That is, by the above processing, the data of the three-dimensional model used for specifying the work target location is narrowed down from the three-dimensional map 102.

In FIG. 11, the interest direction vector and the pointing direction vector are calculated only at the timing immediately after the work operator has been in a resting state. However, respective vectors may be calculated at a plurality of timings within a period determined to be in a resting state. For example, an interest direction vector may be calculated each time the image data and the position and orientation of the camera 301 are input within the resting period, and an average vector may be calculated from an average of each interest direction vector and one pointing direction vector.

Figure 17:
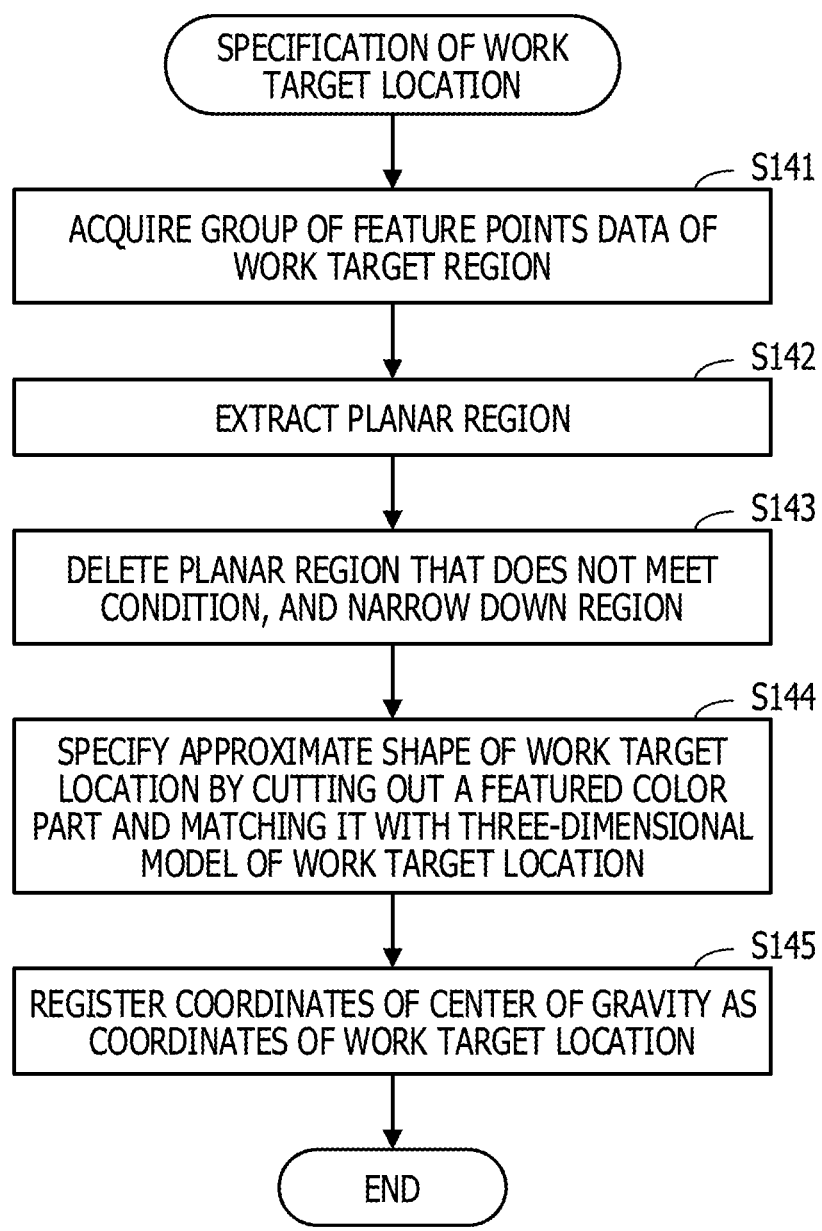
FIG. 17 is an example of a flowchart illustrating a process procedure of specifying a work target location.

Next, the process by the work target location specifying unit 135 illustrated in step S114 in FIG. 11 will be described. FIG. 17 is an example of a flowchart illustrating a process procedure of specifying the work target location.

[step S141] The work target location specifying unit 135 acquires, from the three-dimensional map 102, as data to be processed, the data of a group of feature points included in the work target region specified by the work target region estimation unit 134.

[step S142] The work target location specifying unit 135 extracts planar regions on the three-dimensional model based on the three-dimensional coordinates of the acquired group of feature points.

[step S143] The work target location specifying unit 135 selects a planar region that does not meet the predetermined condition from among the extracted planar regions, and deletes the data of a group of feature points indicating the planar region from the data to be processed (that is, from the group of feature points acquired in step S141). In this process, the planar region that is estimated not to include the work target location is deleted from the three-dimensional model included in the work target region, thereby narrowing down a region to specify a work target location. For example, a planar region with a certain size or more is determined not to be a work target location, whereby the planar region is excluded from the region to specify the work target location.

[step S144] The work target location specifying unit 135 specifies an approximate shape of the work target location based on the data of the group of feature points to be processed. For example, the approximate shape of the work target location is specified by cutting out, based on the color information, a portion where a featured color is present from the three-dimensional model based on the group of feature points to be processed. In the case where a three-dimensional model indicating the shape of the work target location is prepared in advance, an approximate shape of the work target location may be specified by matching the group of feature points to be processed with the prepared three-dimensional model.

[step S145] The work target location specifying unit 135 registers, in the AR content database 101, the three-dimensional coordinates of the center of gravity in the specified approximate shape as the three-dimensional coordinates of the work target location.

Figure 18:
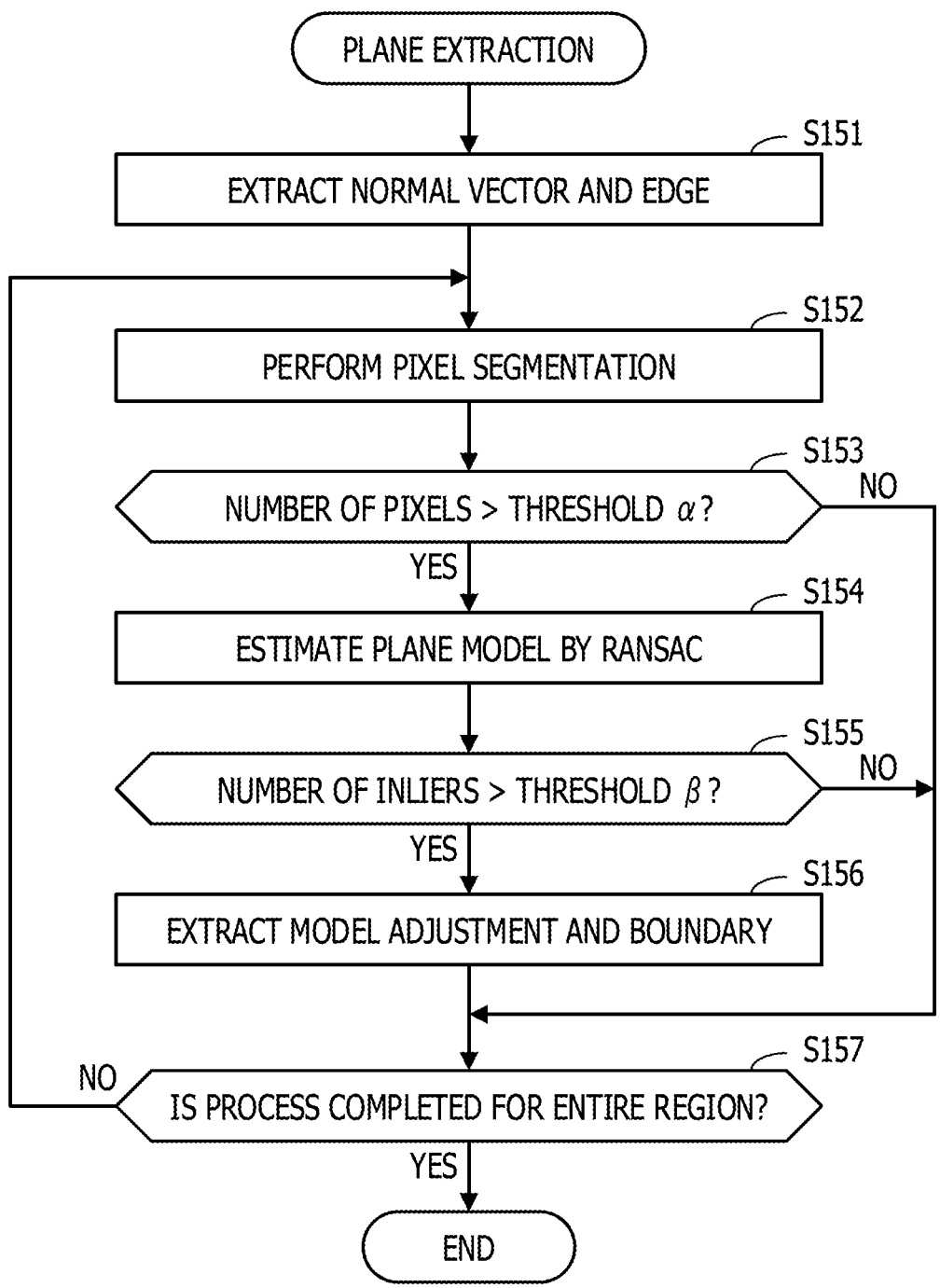
FIG. 18 is an example of a flowchart illustrating a process procedure of extracting a planar region.

FIG. 18 is an example of a flowchart illustrating a process procedure of extracting the planar region. With reference to FIG. 18, an example of the plane extraction process in step S142 in FIG. 17 will be described.

[step S151] The work target location specifying unit 135 extracts a normal vector and an edge from the work target region based on the data of the group of the feature points to be processed.

[step S152] Based on the extraction result of the normal vector and the edge, the work target location specifying unit 135 performs pixel segmentation to extract one small region from the work target region.

[step S153] The work target location specifying unit 135 determines whether the number of pixels (in this case, the number of feature points) included in the extracted small region is larger than a predetermined threshold a. In a case where the number of pixels is larger than the threshold a, the work target location specifying unit 135 performs the process of step S154. In a case where the number of pixels is equal to or less than the threshold a, the work target location specifying unit 135 performs the process of step S157.

[step S154] The work target location specifying unit 135 estimates the plane model by a random sample consensus (RANSAC) based on the data of the group of feature points included in the extracted small region.

[step S155] The work target location specifying unit 135 determines whether the number of inliers indicating the group of feature points included in the estimated plane model is larger than a predetermined threshold P. In a case where the number of inliers is larger than the threshold P, the work target location specifying unit 135 performs the process of step S156. In a case where the number of inliers is equal to or less than the threshold p, the work target location specifying unit 135 performs the process of step S157.

[step S156] The work target location specifying unit 135 adjusts the estimated plane model, and extracts the plane boundary. The fact that the process of step S156 is performed means that the planar region has been extracted from the small region extracted in step S152.

[step S157] The work target location specifying unit 135 determines whether the process of steps S152 to S156 has been completed for the entire work target region. In a case where there is a region for which the process is not performed, the work target location specifying unit 135 advances the process to step S152, and performs the process of step S152 and its subsequent steps for the unperformed region. When the processing is completed for the entire region, the work target location specifying unit 135 ends the plane extraction process.

In the process in FIG. 18 described above, the plane extraction process is performed by using the data of a group of the feature points included in the work target region. As another example, the plane extraction process may be performed by using the depth data for each pixel of the camera image detected by the depth sensor 302.

Figure 19:
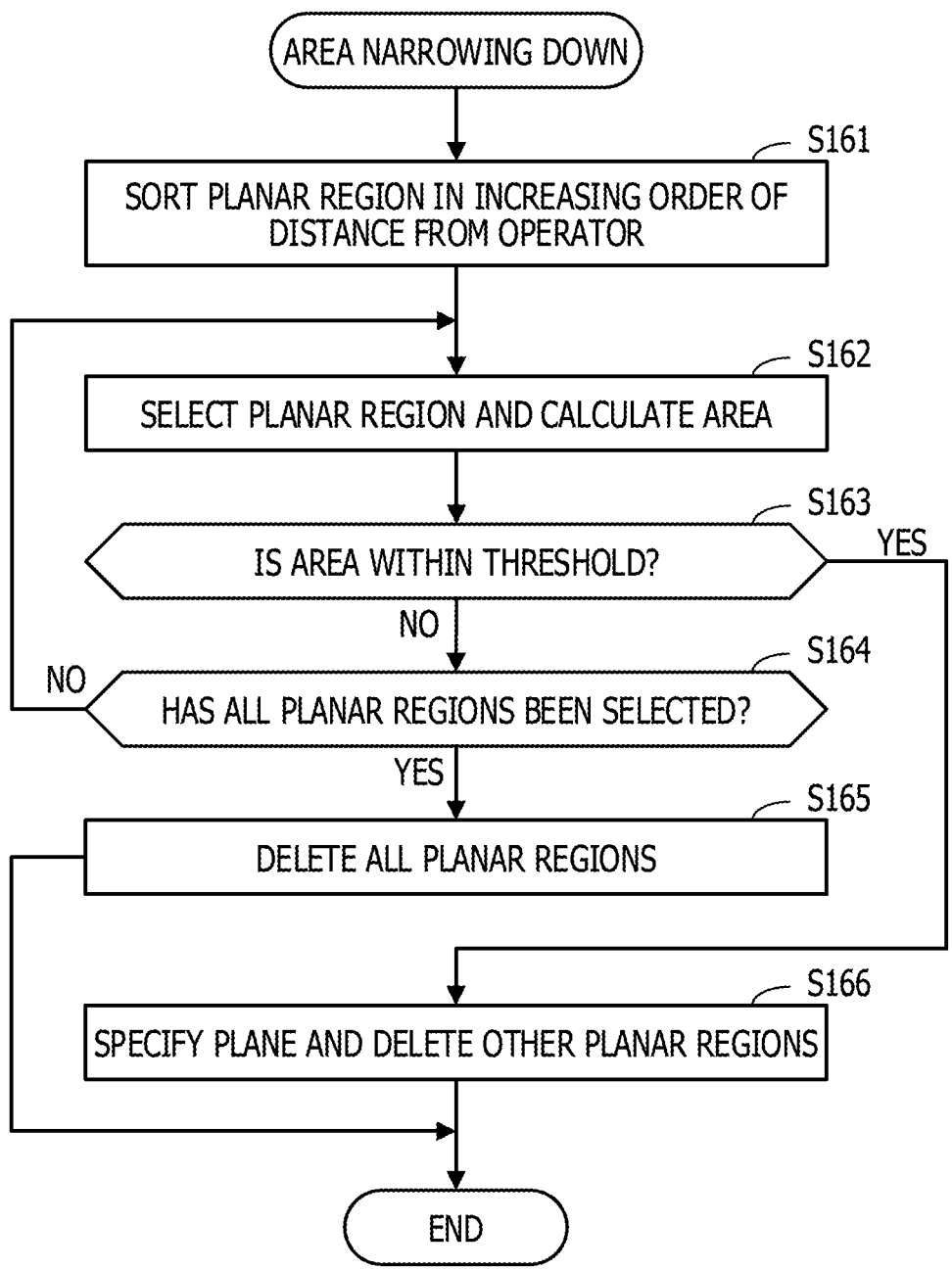
FIG. 19 is an example of a flowchart illustrating a process procedure of narrowing down a region.

FIG. 19 is an example of a flowchart illustrating a process procedure of narrowing down the region. With reference to FIG. 19, an example of the process of narrowing down region in step S143 in FIG. 17 will be described. In FIG. 19, as an example, a planar region that may include a work target location is searched for based on the size of the extracted planar region, and the distance between each planar region and the position of the work operator (the position of the camera 301). In a case where such a planar region is found, regions other than the found planar region are excluded from the region to specify the work target location.

[step S161] The work target location specifying unit 135 calculates the distance between each planar region extracted by the process in FIG. 18 and the work operator, that is, the distance between each planar region and the camera 301. The work target location specifying unit 135 sorts the extracted planar region in increasing order of the distance from the work operator.

[step S162] The work target location specifying unit 135 selects one extracted planar region. Here, every time the process of step S162 is performed, the one planar region is selected according to the sorted order. The work target location specifying unit 135 calculates the area of the selected planar region.

[step S163] The work target location specifying unit 135 determines whether the calculated area is within a predetermined threshold. In a case where the area is within the threshold, the work target location specifying unit 135 performs the process of step S166. In a case where the area exceeds the threshold, the work target location specifying unit 135 performs the process of step S164. In this step S163, as another example, whether the vertical and horizontal sizes of the selected planar region are within respective predetermined thresholds may be determined.

[step S164] The work target location specifying unit 135 determines whether all planar regions extracted by the processing in FIG. 18 have been selected as a region to be calculated. In a case where there are unselected planar regions, the work target location specifying unit 135 advances the process to step S162, and selects one of the unselected planar regions. On the other hand, in a case where all planar regions have been selected, the work target location specifying unit 135 performs the process of step S165.

[step S165] In this case, the area of each of all the extracted planar regions is larger than the threshold, whereby it is determined that the possibility that no extracted planar regions include the work target location is high. Therefore, the work target location specifying unit 135 deletes all estimated planar regions from the three-dimensional model included in the work target region. As a result, the data of the group of feature points to be processed in specifying the work target location is narrowed down.

[step S166] The work target location specifying unit 135 specifies the planar region selected in step S162 as a region that may include the work target location. In this case, the work target location specifying unit 135 selects, as a deletion target, planar regions other than the planar regions selected in step S162 from among the planar regions extracted by the process in FIG. 18, and deletes the planar regions to be deleted from the three-dimensional model included in the work target region. As a result, the data of the group of feature points to be processed in specifying the work target location is narrowed down.

According to the process in FIG. 19 described above, the planar region whose area is equal to or less than the threshold and that is nearest to the position of the work operator among the extracted planar regions is kept for the work target region as a region which may include the work target location, and the other planar regions are deleted from the work target region.

Figure 20:
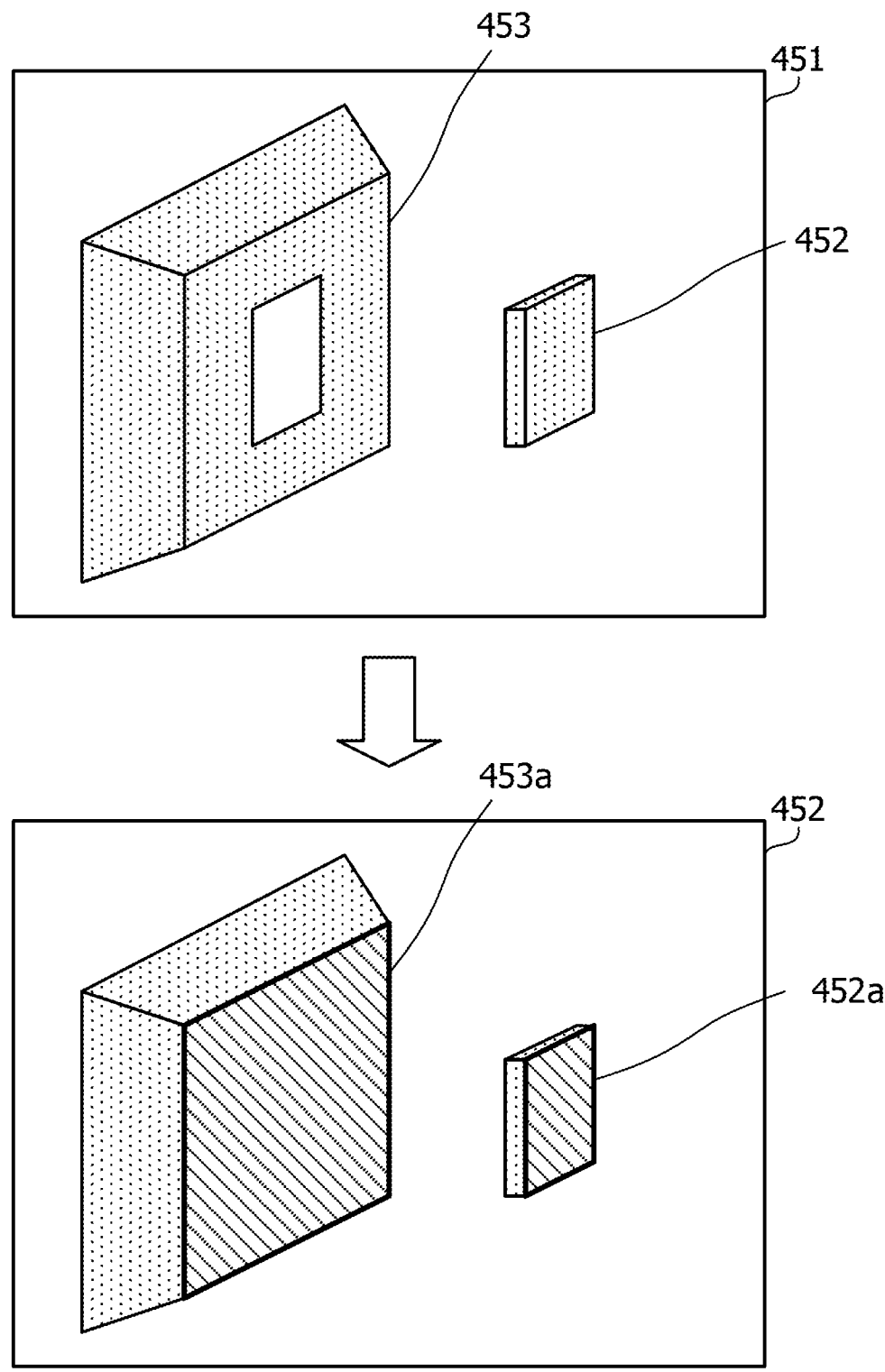
FIG. 20 is a diagram illustrating an example of a process of extracting a plane and narrowing down a region.

FIG. 20 is a diagram illustrating an example of a process of extracting a plane and narrowing down a region. In the example of FIG. 20, three-dimensional models of structures 452 and 453 are photographed in the camera image 451. A planar region 452a is extracted from the structure 452, and a planar region 453a is extracted from the structure 453. For example, by the process in FIG. 19, the planar region 452a is selected as a region which may include the work target location.

In this case, it is estimated that the planar region 453a may be a background region of the structure 452, and the planar region 453a is deleted from the work target region. On the other hand, since it is estimated that the structure 452 in which the planar region 452a is detected has a small size, and protrudes to the work operator side, it is determined that the structure 452 has a possibility of including the work target location.

Next, an example of the process of step S144 in FIG. 17 will be described. As described above, in step S144, an approximate shape of the work target location is specified based on the data of the group of feature points to be processed. In this process, for example, the cut-out process based on color information is performed.

FIG. 21 is an example of a flowchart illustrating a procedure of the cut-out process based on color information.

[step S171] The work target location specifying unit 135 acquires the three-dimensional coordinates and the color information of each feature point to be processed from the three-dimensional map 102.

[step S172] The work target location specifying unit 135 counts the number of pixels (the number of feature points) for each color, and extracts regions with the same color (group of feature points) based on the count result.

[step S173] The work target location specifying unit 135 determines whether there is a region to be removed as a background among the extracted same color regions. For example, a same color region whose ratio of the size (the number of feature points) to the entire number of the feature points is equal to or larger than a certain value is determined to be a region which is to be removed. In a case where there is a region which is to be removed, the work target location specifying unit 135 performs the process of step S174. In a case where there is no region which is to be removed, the work target location specifying unit 135 performs the process of step S175.

[step S174] The work target location specifying unit 135 removes, from the feature point to be processed, the same color region determined to be removed, that is, feature points included in the background region. As a result, the background region is removed from the three-dimensional model included in the work target region.

[step S175] The work target location specifying unit 135 specifies the largest region from among the same color regions based on the position and orientation of the work operator (that is, the position and orientation of the camera 301). For example, the work target location specifying unit 135 calculates the area when viewed from the position of the work operator with respect to each of the same color regions, and specifies the same color region having the largest calculated area. The work target location specifying unit 135 cuts out the specified same color region as an approximate shape of the work target location from the three-dimensional model.

According to the process in FIG. 21 described above, a region whose area is somewhat large among the same color regions is estimated to be the background region, and is removed from the three-dimensional model included in the work target location. The same color region whose area is largest out of the remaining same color regions is a featured color region, and is specified as a region estimated to include the work target location.

The work target location specifying unit 135 specifies the three-dimensional model included in the same color region specified in the above as the approximate shape of the work target location. In step S145 in FIG. 17, the work target location specifying unit 135 registers, in the AR content database 101, the three-dimensional coordinates of the center of gravity in the specified approximate shape as the three-dimensional coordinates of the work target location.

FIG. 22 is a diagram illustrating an example of a process of specifying the work target location by a plane extraction and a cut-out based on color information. The work target location is practically specified as a three-dimensional shape. In FIG. 22, for the sake of convenience, a process of specifying the work target location with reference to the photographing direction of a camera image 461 will be described.

In the example of FIG. 22, planar regions 462 and 463 are extracted by the plane extraction process illustrated in FIG. 19. Of these planar regions, the planar region 462 is specified as a region that may include the work target location, while the planar region 463 is deleted from the three-dimensional model included in the work target region.

Next, the cut-out process based on the color information illustrated in FIG. 21 is performed on each feature point included in the work target region from which the planar region 463 is deleted, and a same color region 464 is specified. As a result, a three-dimensional shape 465 corresponding to the same color region 464 is specified as an approximate shape of the work target location from the three-dimensional model, and the three-dimensional coordinates of the center of gravity 465a of the three-dimensional shape 465 are registered in the AR content database 101 as the three-dimensional coordinates of the work target location.

In the process in FIG. 22 described above, the plane extraction process has been performed for the purpose of only removing the region with a low possibility of including the work target location. However, as another example, the plane extraction process may be performed for the purpose of narrowing down the region with a high possibility of including the work target location. For example, in FIG. 22, the cut out process based on the color information may be performed using only the color information of the group of feature points included in the planar region 462.

In the process of specifying the approximate shape of the work target location, as aforementioned, a matching process using a prepared three-dimensional model indicating the shape of the work target location may be performed. In this case, for example, the matching may be performed for the entire three-dimensional model included in the work target location. As in the camera image 461 illustrated in the upper right of FIG. 22, the matching may be performed for the region from which the background planar region has been removed. The matching using a three-dimensional model, and the cut-out based on color information may be used together. In this case, for example, an overlapping portion of a region specified as the work target location by each process is finally specified as an approximate shape of the work target location.

As described above, the work target location specifying unit 135 may specify the region of the three-dimensional model of the facility or the device to be a work target based on the geometric shape and color information of the three-dimensional model in the work target region. The work target region estimation unit 134 narrows down the work target region based on the interest direction and the pointing direction of the work operator, and the work target location specifying unit 135 searches for the work target location only from the three-dimensional model included in such work target region. As a result, the work target location specifying unit 135 may specify the work target location with high accuracy.

The work support system according to the second embodiment described above may be modified as follows. For example, the work operator terminal 200a may have part of the processing function of the work support device 100. As an example, the work operator terminal 200a may have the processing function of the resting state determination unit 133. In this case, the work operator terminal 200a determines, based on the data detected by the sensor unit 216, whether the work operator is in a resting state. The position and orientation of the camera 301 is transmitted from the work operator terminal 200a to the work support device 100 in a period in which it is determined that the work operator is in a resting state. This makes it unnecessary to transmit the data detected by the sensor unit 216 at all times and the position and orientation of the camera 301 to the work support device 100, thereby reducing the communication load of the network.

The work support device 100 may have part of the processing function of the work operator terminal 200a. For example, the work support device 100 may have the processing function of the SLAM processing unit 231. In this case, image data and depth data are transmitted from the work operator terminal 200a to the work support device 100, and the work support device 100 performs the SLAM process.

The processing functions of the devices illustrated in each of the above embodiments (for example, the information processing device 1, the work support device 100, and the work operator terminals 200a and 200b) may be implemented by a computer. In this case, a program describing processing contents of the function which each device has is provided and the computer executes the program, whereby the above-described processing functions are implemented by the computer. The program describing the processing contents may be recorded in a computer-readable recording medium. Examples of a computer-readable recording medium include a magnetic storage device, an optical disc, a magneto-optical recording medium, and a semiconductor memory. Examples of the magnetic storage device includes a hard disc drive (HDD), a flexible disc (FD), and a magnetic tape. Examples of the optical disc include a compact disc (CD), a digital versatile disc (DVD), and a Blu-ray Disc (BD). Examples of the magneto-optical recording medium include a magneto-optical disc (MO).

When distributing the program, for example, a portable recording medium such as a DVD or a CD on which the program is recorded is sold. It is also possible to transfer the program which is stored in the storage device of the server computer from the server computer to another computer through the network.

The computer that executes the program, for example, stores in its own storage device the program recorded in the portable recording medium or the program transferred from the server computer. The computer reads the program from its own storage device, and executes processing according to the program. The computer reads the program directly from the portable recording medium, and may execute processing according to the program. Each time a program is transferred from a server computer connected the computer via a network the computer may sequentially execute processing according to the received program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device configured to cooperate with a system, the system including a mobile terminal movable along with a work operator in a work site, the information processing device comprising:
a network interface circuit configured to communicate with the mobile terminal movable;

a memory configured to store data illustrating a three-dimensional model reproducing an environment of the work site, the three-dimensional model including a plurality of feature points, wherein each of the feature points includes three-dimensional coordinates, feature quantity, and color information; and a processor coupled to the memory and configured to perform authoring processing in response to an operation by a person different from the work operator, the authoring processing including:

obtaining, via the network interface circuit, an image photographed by a camera configured to photograph a region of the work site in a line-of-sight direction of the work operator;

obtaining an estimated location of the work operator and an estimated orientation of the work operator from the mobile terminal via the network interface circuit;

obtaining a first partial region from among the work site reproduced in the three-dimensional model by using the estimated location and the estimated orientation, the first partial region being a region at the estimated location and having a given size centered on the estimated orientation;

in response to the obtaining of the first partial region, searching a second partial region from among the first partial region by comparing the plurality of feature points corresponding to the first partial region and predetermined feature points of a work target associated with the work site, the second partial region being a region including the work target in the work site; and in response to detecting of the second partial region in the searching of the second partial region, registering, in the memory, position information indicating a position of the work target by using the three-dimensional coordinates corresponding to the second partial region, the position information being information configured to be used to display, according to the position of the work target, image information on an image in which the work site is photographed, wherein the obtaining of the first partial region is configured to, in response to the obtained image including a scene in which the work operator points out a direction of a position of the work target by an arm portion of the work operator in the work site, obtain a pointing direction corresponding to the direction pointed by the arm portion of the work operator by matching a plurality of feature points obtained from the image and a predetermined three-dimensional model corresponding to the arm portion, the arm portion of the work operator including a region from an elbow to a fingertip of the work operator, and obtain the first partial region by using an average vector, the average vector being a vector obtained by averaging the orientation of the work operator and the pointing direction obtained based on a result of the matching.

2. The information processing device according to claim 1,
wherein the processor is configured to
determine an activity degree of the work operator based on a detection result of a position of the work operator, and
the obtaining of the first partial region is performed in response to a determination result indicating that the activity degree of the work operator is less than a threshold.

3. The information processing device according to claim 1,
wherein the obtaining of the first partial region is configured to, in a case where the work operator performs a pointing operation indicating a direction of a position of the work target, obtain the first partial region based on the orientation of the work operator and the direction indicated by the pointing operation of the work operator.

4. The information processing device according to claim 1,
wherein the obtaining of the first partial region is configured to obtain the first partial region by using a position at which a line extended along with the orientation of the work operator from a position where the work operator is placed intersects the three-dimensional model.

5. The information processing device according to claim 1,
wherein the obtaining of the second partial region is configured to obtain the second partial region by using a size of a planar region detected from the first partial region and a distance between the planar region and the work operator.

6. The information processing device according to claim 1,
wherein the obtaining of the second partial region is configured to obtain the second partial region by using a size of a region for each color in the first partial region.

7. The information processing device according to claim 1,
wherein the obtaining of the second partial region is configured to obtain the second partial region by performing a matching process, the matching process being configured to match another three-dimensional model modeling the work target with a plurality of feature points within the first partial region.

8. The information processing device according to claim 1,
wherein an orientation of the work operator is detected based on an image of the work site captured by an image pickup device held by the work operator.

9. The information processing device according to claim 8,
wherein based on the captured image, an orientation of the work operator is detected, and the three-dimensional model is created.

10. An information processing system comprising:
a detection device configured to detect an orientation of a work operator present at a work site; and
a information processing device including:
a network interface circuit configured to communicate with a mobile terminal movable along with a work operator in a work site;
a memory configured to store data illustrating a three-dimensional model reproducing an environment of the work site, the three-dimensional model including a plurality of feature points, wherein each of the feature points includes three-dimensional coordinates, feature quantity, and color information; and
a processor coupled to the memory and configured to perform authoring processing in response to an operation by a person different from the work operator, the authoring processing including:

obtaining, via the network interface circuit, an image photographed by a camera configured to photograph a region of the work site in a line-of-sight direction of the work operator;

obtaining an estimated location of the work operator and an estimated orientation of the work operator from the mobile terminal via the network interface circuit;

obtaining a first partial region from among the work site reproduced in the three-dimensional model by using the estimated location and the estimated orientation, the first partial region being a region at the estimated location and having a given size centered on the estimated orientation;

in response to the obtaining of the first partial region, searching a second partial region from among the first partial region by comparing the plurality of feature points corresponding to the first partial region and predetermined feature points of a work target associated with the work site, the second partial region being a region including the work target in the work site; and in response to detecting of the second partial region in the searching of the second partial region, registering, in the memory, position information indicating a position of the work target by using the three-dimensional coordinates corresponding to the second partial region, the position information being information configured to be used to display, according to the position of the work target, image information on an image in which the work site is photographed, wherein the obtaining of the first partial region is configured to, in response to the obtained image including a scene in which the work operator points out a direction of a position of the work target by an arm portion of the work operator in the work site, obtain a pointing direction corresponding to the direction pointed by the arm portion of the work operator by matching a plurality of feature points obtained from the image and a predetermined three-dimensional model corresponding to the arm portion, the arm portion of the work operator including a region from an elbow to a fingertip of the work operator, and obtain the first partial region by using an average vector, the average vector being a vector obtained by averaging the orientation of the work operator and the pointing direction obtained based on a result of the matching.

11. The information processing system according to claim 10, wherein the detection device is configured to detect the orientation of the work operator based on an image of the work site captured by an image pickup device held by the work operator.

12. The information processing system according to claim 11, wherein the detection device is configured to
perform a process of detecting the orientation of the work operator and a process of forming the three-dimensional model based on the captured image, and
transmit a detection result of the orientation of the work operator and data of the formed three-dimensional model to the information processing device.

13. A non-transitory computer-readable storage medium for storing a program which causes a processor to perform authoring processing in response to an operation by a first operator, the authoring processing comprising:

obtaining data illustrating a three-dimensional model reproducing an environment of a work site, the three-dimensional model including a plurality of feature points, wherein each of the feature points includes three-dimensional coordinates, feature quantity, and color information;

communicating with a mobile terminal through a network interface to obtain an estimated location of a second operator and an estimated orientation of the second operator from the mobile terminal via the network interface circuit, the mobile terminal being movable along with the second operator in the work site, the second operator being a person other than the first operator;

obtaining, via the network interface circuit, an image photographed by a camera configured to photograph a region of the work site in a line-of-sight direction of the second operator;

obtaining a first partial region from among the work site reproduced in the three-dimensional model by using the estimated location and the estimated orientation, the first partial region being a region at the estimated location and having a given size centered on the estimated orientation;

in response to the obtaining of the first partial region, searching a second partial region from among the first partial region by comparing the plurality of feature points corresponding to the first partial region and predetermined feature points of a work target associated with the work site, the second partial region being a region including the work target in the work site; and in response to detecting of the second partial region in the searching of the second partial region, registering, in the memory, position information indicating a position of the work target by using the three-dimensional coordinates corresponding to the second partial region, the position information being information configured to be used to display, according to the position of the work target, image information on an image in which the work site is photographed, wherein the obtaining of the first partial region is configured to, in response to the obtained image including a scene in which the second operator points out a direction of a position of the work target by an arm portion of the second operator in the work site, obtain a pointing direction corresponding to the direction pointed by the arm portion of the second operator by matching a plurality of feature points obtained from the image and a predetermined three-dimensional model corresponding to the arm portion, the arm portion of the second operator including a region from an elbow to a fingertip of the second operator, and obtain the first partial region by using an average vector, the average vector being a vector obtained by averaging the orientation of the work operator and the pointing direction obtained based on a result of the matching.

* * * * *